US008468458B2

(12) United States Patent
Lee et al.

(10) Patent No.: US 8,468,458 B2
(45) Date of Patent: Jun. 18, 2013

(54) DYNAMIC AND LOCAL MANAGEMENT OF HIERARCHICAL DISCUSSION THREAD DATA

(75) Inventors: Jongwoo Lee, San Francisco, CA (US); Manish Upendran, San Jose, CA (US); Locke D. Berkebile, Alamo, CA (US); Jason Brightman, Oakland, CA (US)

(73) Assignee: Apollo Group, Inc., Phoenix, AZ (US)

( * ) Notice: Subject to any disclaimer, the term of this patent is extended or adjusted under 35 U.S.C. 154(b) by 0 days.

(21) Appl. No.: 13/409,003

(22) Filed: Feb. 29, 2012

(65) Prior Publication Data

US 2013/0125063 A1    May 16, 2013

Related U.S. Application Data

(63) Continuation of application No. 13/294,819, filed on Nov. 11, 2011.

(51) Int. Cl.
*G06F 3/00* (2006.01)

(52) U.S. Cl.
USPC ......................................................... 715/745

(58) Field of Classification Search
USPC .......................... 715/707, 745, 747, 744, 752
See application file for complete search history.

(56) References Cited

U.S. PATENT DOCUMENTS

| 6,121,968 | A * | 9/2000 | Arcuri et al. ................ 715/825 |
| 6,204,846 | B1 * | 3/2001 | Little et al. ................... 715/784 |
| 7,370,277 | B1 | 5/2008 | Canfield et al. |
| 7,631,276 | B2 | 12/2009 | Gruen et al. |
| 2005/0144573 | A1 | 6/2005 | Moody et al. |
| 2007/0282956 | A1 | 12/2007 | Staats |
| 2008/0005234 | A1 | 1/2008 | Newnam |
| 2009/0138828 | A1 | 5/2009 | Schultz et al. |
| 2009/0187855 | A1 | 7/2009 | Gruen et al. |
| 2009/0265671 | A1 | 10/2009 | Sachs et al. |
| 2009/0313587 | A1 | 12/2009 | Goodwin |
| 2010/0023387 | A1 | 1/2010 | Pan |
| 2010/0218142 | A1 | 8/2010 | Chen et al. |
| 2010/0229127 | A1 | 9/2010 | Williams |
| 2011/0041082 | A1 * | 2/2011 | Nguyen ........................ 715/752 |
| 2011/0078206 | A1 | 3/2011 | Chen et al. |
| 2011/0113375 | A1 | 5/2011 | Moody et al. |

(Continued)

OTHER PUBLICATIONS

USPTO, "Data Processing: Presentation Processing of Document, Operator Interface Processing, and Screen Saver Display Processing", http://ptoweb.8081/uspc715/sched715.htm, dated Aug. 9, 2012, 3 pages.

*Primary Examiner* — Thanh Vu
(74) *Attorney, Agent, or Firm* — Hickman Palermo Truong Becker Bingham Wong LLP

(57) ABSTRACT

Techniques are described for display and navigation of hierarchical messages, which displays include contextual data for the messages. Context information for a current message includes reply messages, parent messages, and metadata representations. Message representations are also associated with visual depth indicators that are independent of the text of the messages. Users may navigate displays of hierarchical message data using different navigational inputs. For example, more information may be requested for messages, without selecting a new message for viewing as a focal message, using swipes across portions of the display dedicated to displaying the messages. A limited number of messages for a requested list of messages is initially retrieved and displayed, and a mechanism for viewing more messages from the list is provided. Historical usage of the mechanism is recorded and the number of messages to be displayed for the list of messages is adjusted based on the historical usage data.

17 Claims, 13 Drawing Sheets

U.S. PATENT DOCUMENTS

2011/0271202 A1  11/2011  Wong et al.
2012/0023455 A1  1/2012  Chen et al.
2012/0042267 A1  2/2012  Cairns
2012/0133600 A1  5/2012  Marshall et al.

* cited by examiner

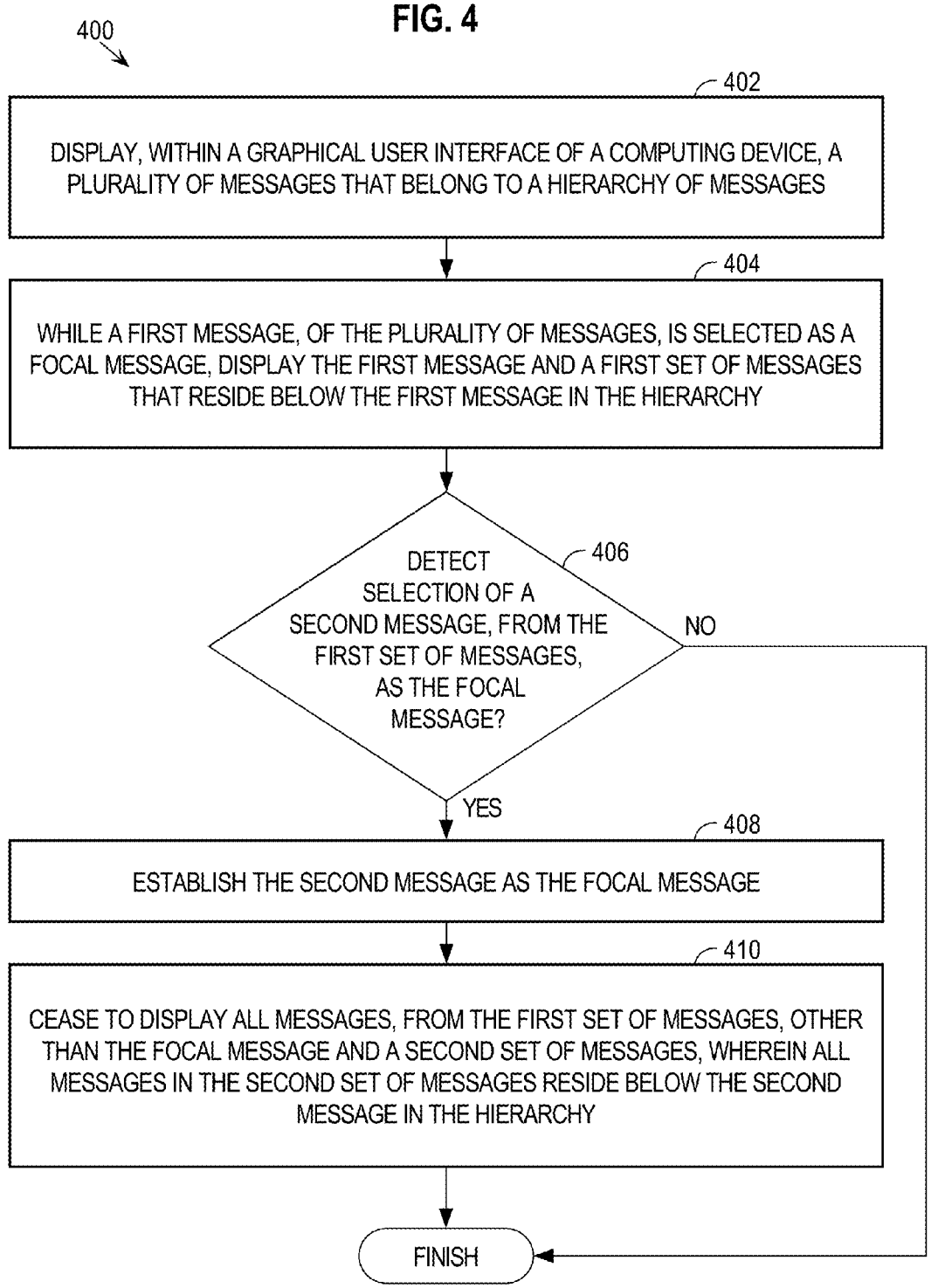

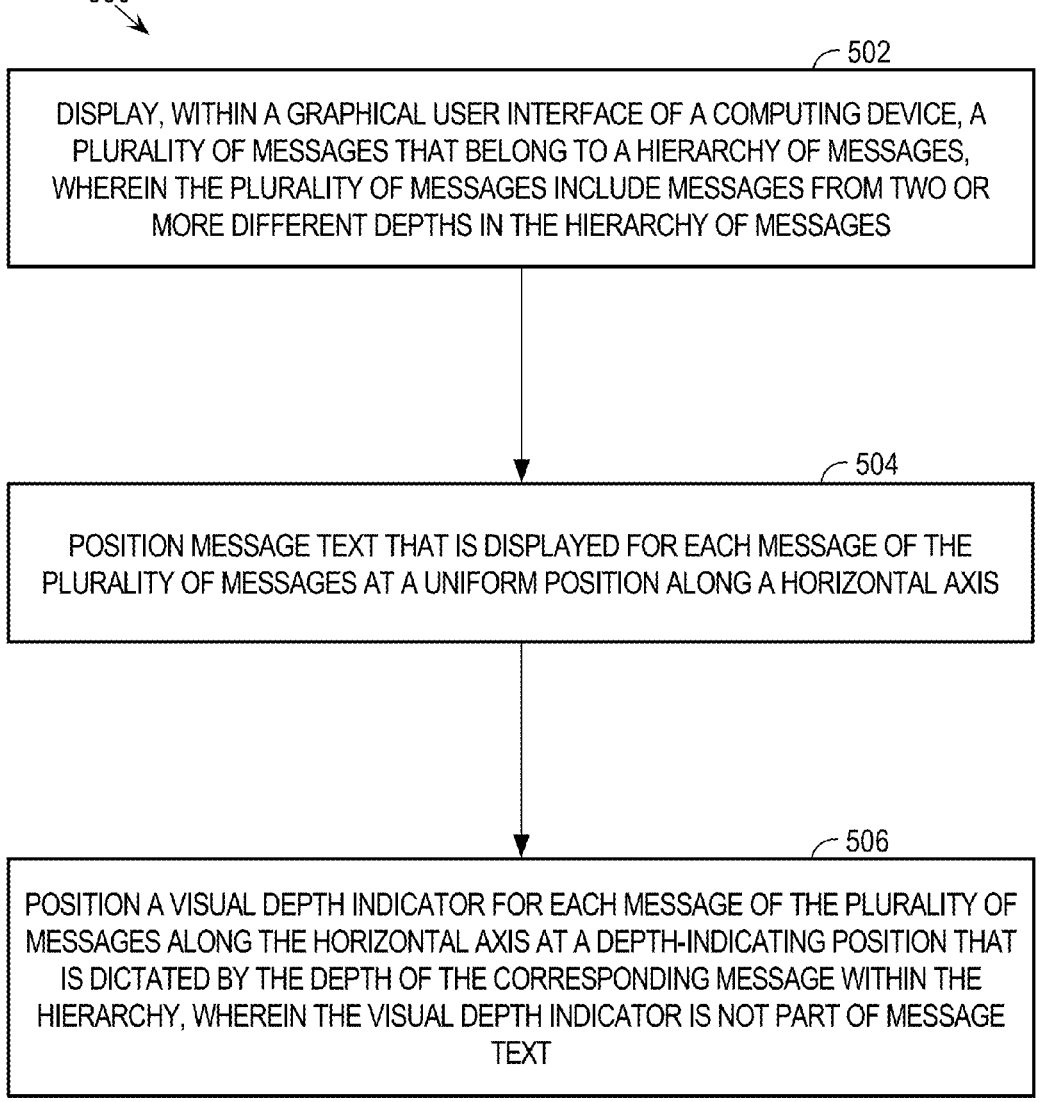

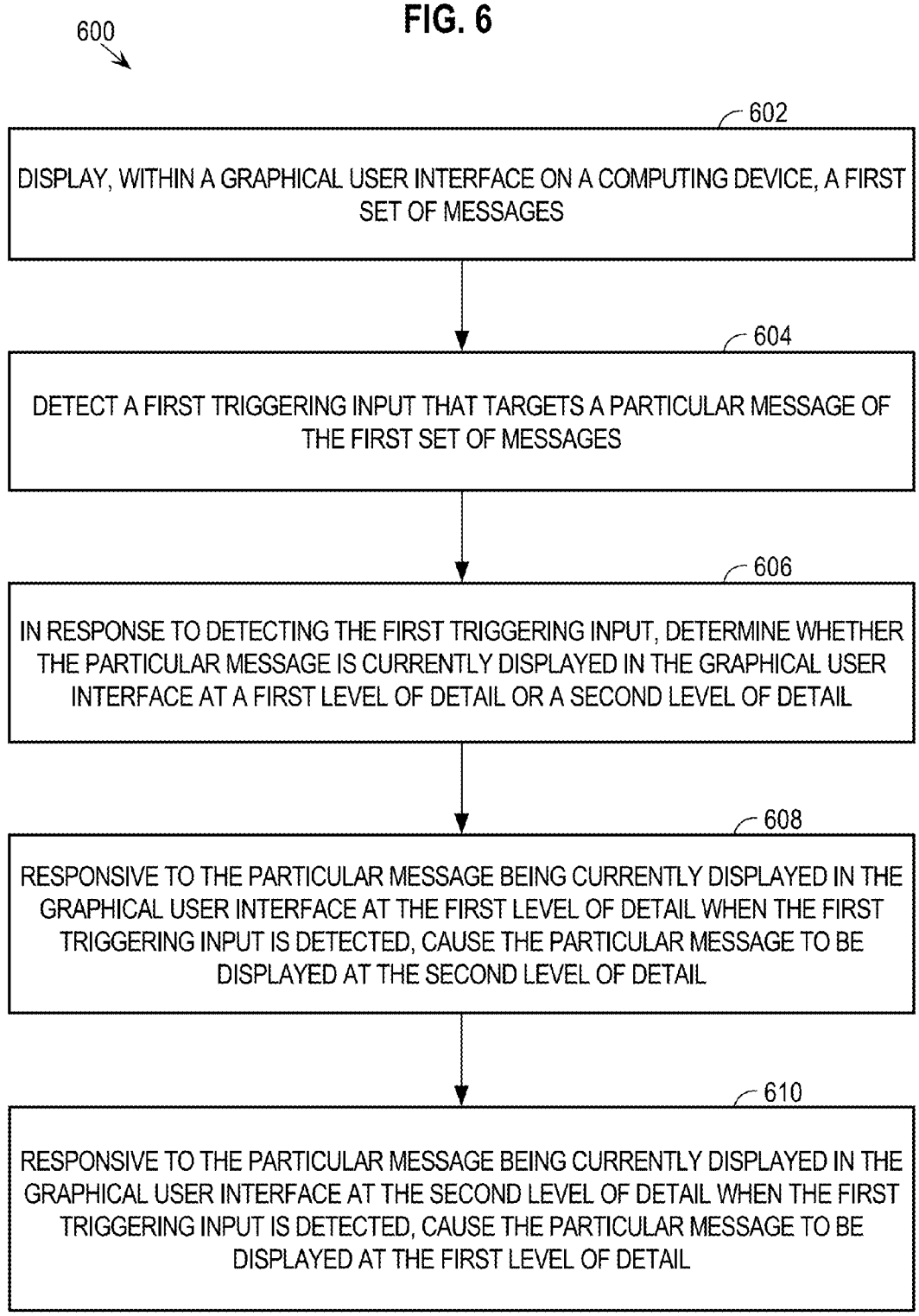

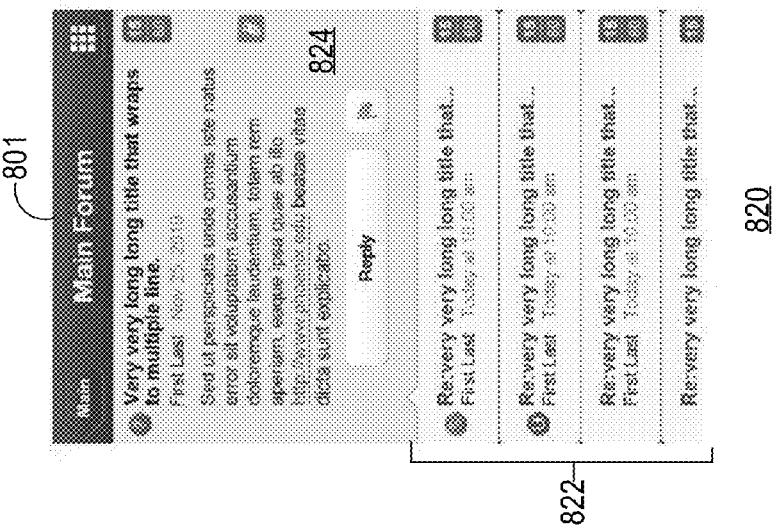
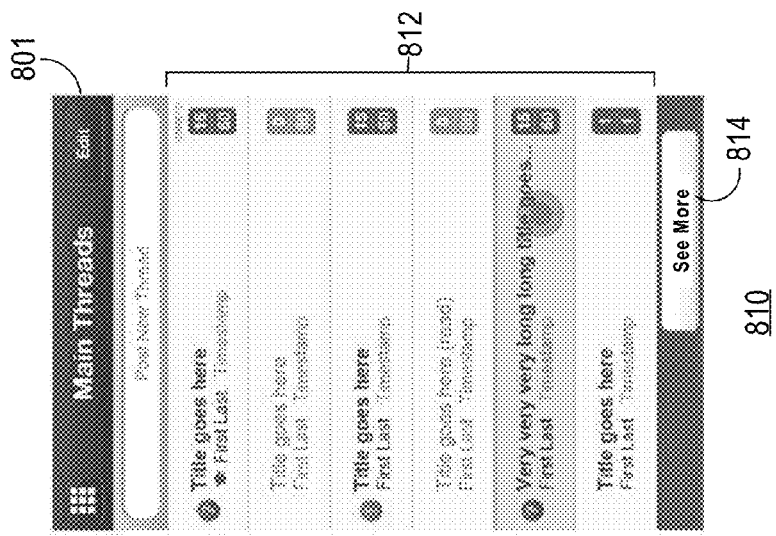
FIG. 8

DYNAMIC AND LOCAL MANAGEMENT OF HIERARCHICAL DISCUSSION THREAD DATA

CROSS-REFERENCE TO RELATED APPLICATIONS

Benefit Claim

This application is a Continuation of Non-Provisional application Ser. No. 13/294,819 filed Nov. 11, 2011 and is related to U.S. patent application Ser. No. 13/294,808 entitled "Hierarchy-Indicating Graphical User Interface For Discussion Threads", filed Nov. 11, 2011, and U.S. patent application Ser. No. 13/294,814 entitled "Efficient Navigation Of Hierarchical Data Displayed In A Graphical User Interface", filed Nov. 11, 2011, the entire contents of all of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to displaying and navigating hierarchical message data, and more specifically, to displaying and navigating hierarchical message data in a manner that may be easily performed on devices that have a relatively small display or a display with a relatively low screen resolution.

BACKGROUND

A discussion thread is a set of related messages. The relationships that are between the messages in a discussion thread are typically "comment/response" relationships. For example, a discussion thread may be initiated by a root message on a forum, which root message may include a comment or question. Users may respond to the root message, or to response messages under the root message, thus forming a hierarchy of messages. Sometimes, a forum will allow users to receive notifications of changes that have been made to a discussion thread, including new messages that have been posted to the thread. Thus, users may communicate about a particular subject in a dynamic manner, posting thoughts or questions that the users find pertinent to the subject and responding to other users' messages.

Discussion threads are widely used to facilitate communication about particular subjects, usually in connection with a forum on a particular subject. In an educational context, a forum may be dedicated to a particular class, and a discussion thread in the forum may be on a particular issue raised in connection with the particular class. For example, in a forum for a business class, a discussion thread may develop discussing various requirements of a particular homework assignment.

Display space permitting, a discussion thread is typically displayed with many or all of the messages shown in full, including responses to the root message, responses to the response messages, etc. If a message in the display is represented in an abbreviated manner, a user may request more details about the abbreviated message. In response to such a request, the text of the abbreviated message is generally added to the display of the rest of the fully displayed messages.

If a discussion thread includes many messages on many hierarchical levels of depth, the display of the thread can become cumbersome and confusing to navigate. For example, it may be difficult to track exactly where a particular message is with respect to the overall hierarchy of the thread. It may also be difficult to navigate to particular messages in the hierarchy, or even to navigate up the hierarchy to parent messages of the current message that a user is viewing. These problems are exacerbated when the discussion thread is displayed on a display with a small surface area, such as a mobile device display, or a display with a low screen resolution.

One way to indicate the hierarchical depth of a message within a thread involves indenting the message text. For example, the text of a reply message may be left-indented relative to the left alignment of the reply message's parent message text to give a visual indication of relative hierarchical position. However, text indentation does not work well with limited screen size because left indentation may leave very little horizontal space for message text. Also, when text wraps too quickly, the text becomes difficult for a user to read. Using text indentation with a small screen quickly dedicates too much of the horizontal space of the screen to indentations indicating hierarchical depth, especially when displaying a thread with a deep hierarchy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 illustrates a flowchart for displaying and navigating a hierarchy of messages within a graphical user interface.

FIG. 5 illustrates a flowchart for associating visual depth indicators with message representations.

FIG. 6 illustrates a flowchart for navigating a set of messages using triggering inputs for a computing device.

FIG. 8 illustrates further graphical user interfaces that display message representations from message hierarchies.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for display and navigation of hierarchical message data, such that the context of the portion of data currently being displayed is evident. These techniques may be used for displays with a small display area and displays with a low screen resolution. Context information for a current message being viewed includes one or more of reply messages to the current message, parent messages of the current message, a shortcut to a list of message hierarchies that a user may navigate, and metadata representations to give a user information about the messages being represented.

Visual depth indicators are also associated with message representations to give further contextual information about messages being displayed. The visual depth indicators are independent of the alignment of the text of the messages. Consequently, screen space that would otherwise be dedicated to indenting message text to convey hierarchical depth can instead be used to display more message text per horizontal line. Spacing for visual depth indicators may be scaled depending on a number of hierarchical levels being represented in a graphical user interface.

Users may navigate displays of hierarchical message data using different navigational inputs. For example, using a touch screen, a message may be selected for viewing as a focal message by tapping on the message (e.g., with a finger or stylus). Also, more information may be displayed for messages, without selecting a new message for viewing as a focal message, using various triggering inputs that target one or more messages being displayed.

In one embodiment, data retrieved to populate displays of hierarchical messages is stored at a client device to reduce the cost of requests to display the data. A limited number of messages for a requested list of messages is initially retrieved and displayed, and a mechanism for viewing more messages from the list is provided. Historical usage of the mechanism is recorded and the number of messages to be displayed for the list of messages is adjusted based on the historical usage.

Hierarchical Message Display Architecture

Figure 1:
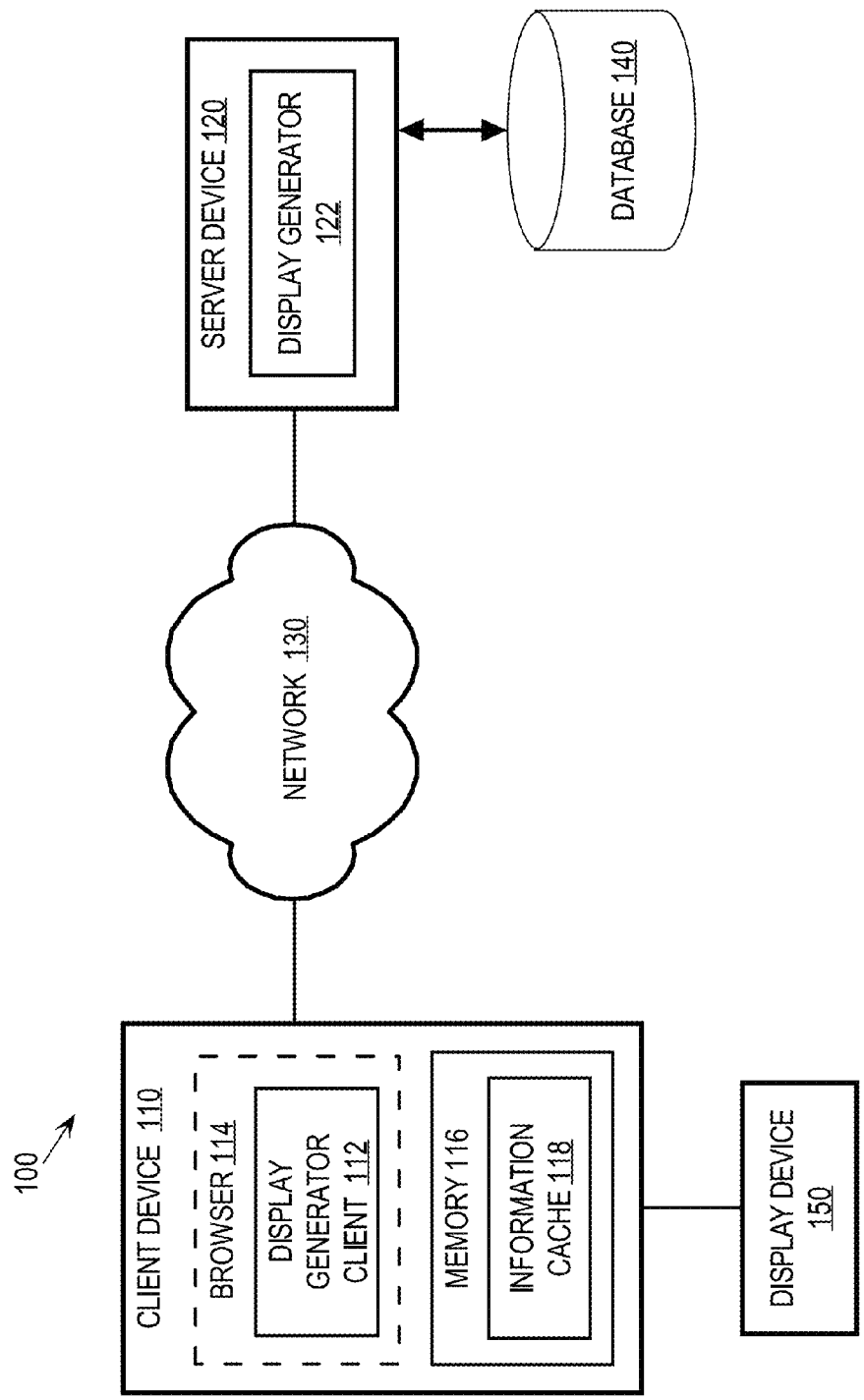
FIG. 1 is a block diagram that depicts an example network arrangement for a hierarchical message display.

An example hierarchical message display generator may reside on a server and provide information for displaying hierarchical messages, which information is requested from the display generator over a network. FIG. 1 is a block diagram that depicts an example network arrangement 100 for generating hierarchical message displays, according to embodiments. Network arrangement 100 includes a client device 110 and a server device 120 communicatively coupled via a network 130. Server device 120 is also communicatively coupled to a database 140 and client device 110 is communicatively coupled to a display device 150.

Client device 110 may be implemented by any type of client device that is communicatively connected to network 130. Example implementations of client device 110 include, without limitation, workstations, personal computers, laptop computers, personal digital assistants (PDAs), tablet computers, cellular telephony devices, and any type of mobile devices. In network arrangement 100, client device 110 is configured with a display generator client 112. Display generator client 112 may be implemented in any number of ways, including as a stand alone application, as a plug-in to a browser 114 (which may be implemented on client device 110), etc. Browser 114 is configured to interpret and display web pages received over network 130, such as Hyper Text Markup Language (HTML) pages, and Extensible Markup Language (XML) pages, etc. Browser 114 may also be configured to facilitate other kinds of communication between client device 110 and server device 120 over network 130.

Client device 110 is also configured with memory 116, which may comprise volatile and/or non-volatile storage, including random access memory (RAM), one or more hard or floppy disks, main memory, flash memory, memory cards, etc. In one embodiment, information cache 118 resides in memory 116. In another embodiment, information cache 118 resides on storage that is external to client device 110. In another embodiment, information cache 118 resides on a persistent removable storage device such as a flash drive, hard disk storage, or Secure Digital (SD) memory card. In yet another embodiment, information cache 118 resides on a combination of multiple storage devices. In one embodiment, information cache 118 stores information about hierarchical messages and metadata therefor, described in further detail below, which are utilized by display generator client 112 to create displays of hierarchical messages. Client device 110 may also be configured with other mechanisms, processes, and functionality, depending upon a particular implementation.

A display device 150 is communicatively coupled to client device 110 and may be implemented by any type of device capable of displaying images produced by client device 110. Example implementations include a monitor, a screen, a touch screen, a projector, a light display, a display of a tablet computer, a television, etc.

Network 130 may be implemented with any type of medium and/or mechanism that facilitates the exchange of information between client device 110 and server device 120. Furthermore, network 130 may use any type of communications protocol, and may be secured or unsecured, depending upon the requirements of a particular embodiment.

Server device 120 may be implemented by any type of device that is capable of communicating with client device 110 over network 130. In network arrangement 100, server device 120 is configured with display generator 122. Display generator 122 is capable of producing information for display generator client 112. As such, display generator 122 may receive and respond to Application Programming Interface (API) calls from display generator client 112, Simple Object Access Protocol (SOAP) messages, requests via HyperText Transfer Protocol (HTTP), HyperText Transfer Protocol Secure (HTTPS), Simple Mail Transfer Protocol (SMTP), etc., or any other kind of message from display generator client 112. Further, display generator 122 may send one or more of the following over network 130 to display generator client 112: information via HTTP, HTTPS, SMTP, etc.; XML data; SOAP messages; API calls; and other information according to embodiments.

Display generator 122 may be implemented by one or more logical modules, and is described in further detail below. Server device 120 may be configured with other mechanisms, processes and functionalities, depending upon a particular implementation.

Server device 120 is communicatively coupled to database 140. Database 140 may reside in any type of storage, including volatile and non-volatile storage including random access memory (RAM), one or more hard or floppy disks, or main memory. The storage on which database 140 resides may be external or internal to server device 120. In one embodiment, database 140 stores information about hierarchical messages and metadata therefor, described in further detail below, which are utilized by display generator 122.

Displaying Hierarchical Message Threads

Figure 2A:
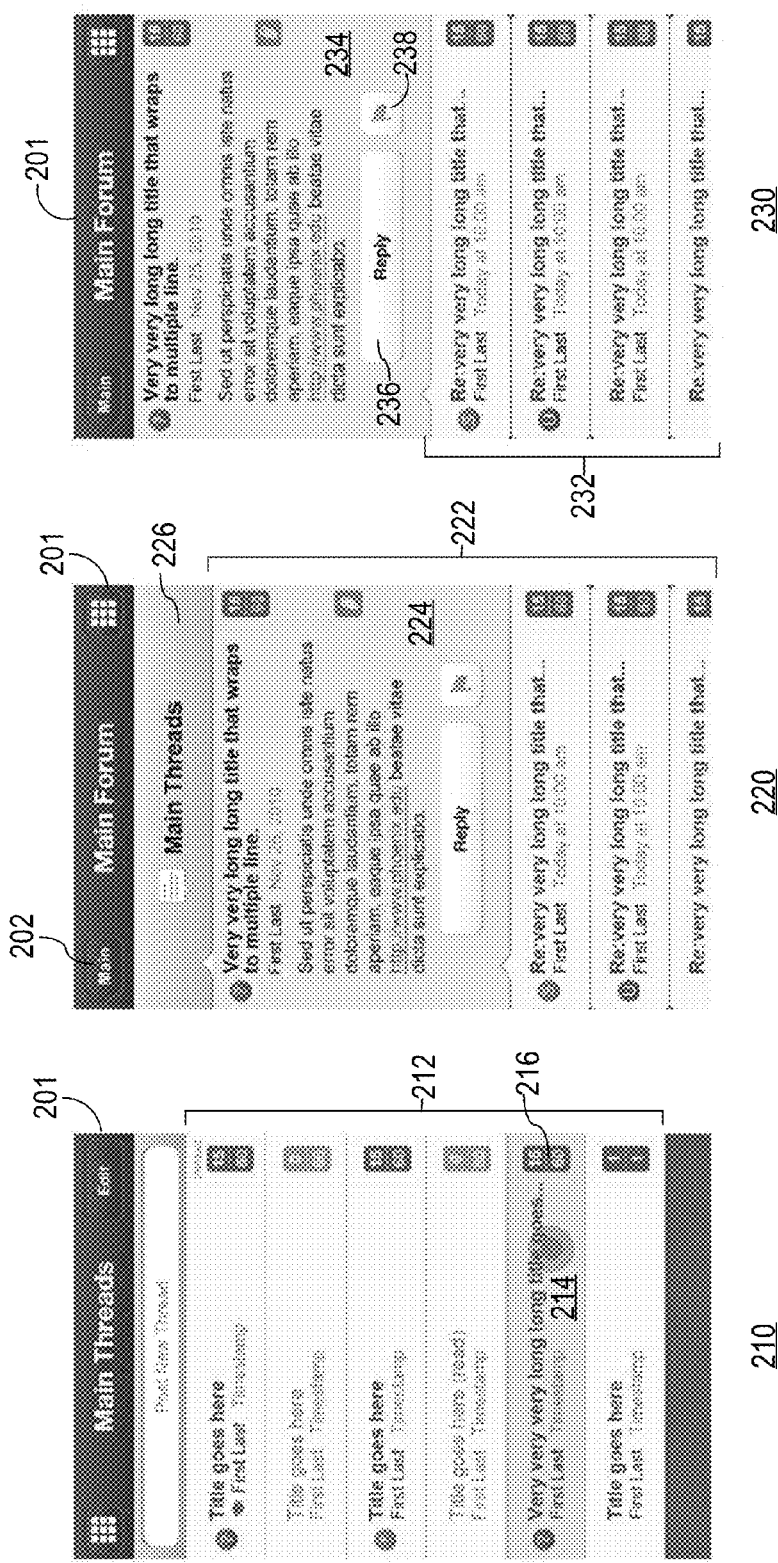
FIGS. 2A-2C illustrate examples of graphical user interfaces for displaying and facilitating navigation of hierarchically-organized sets of messages.
Figure 2B:
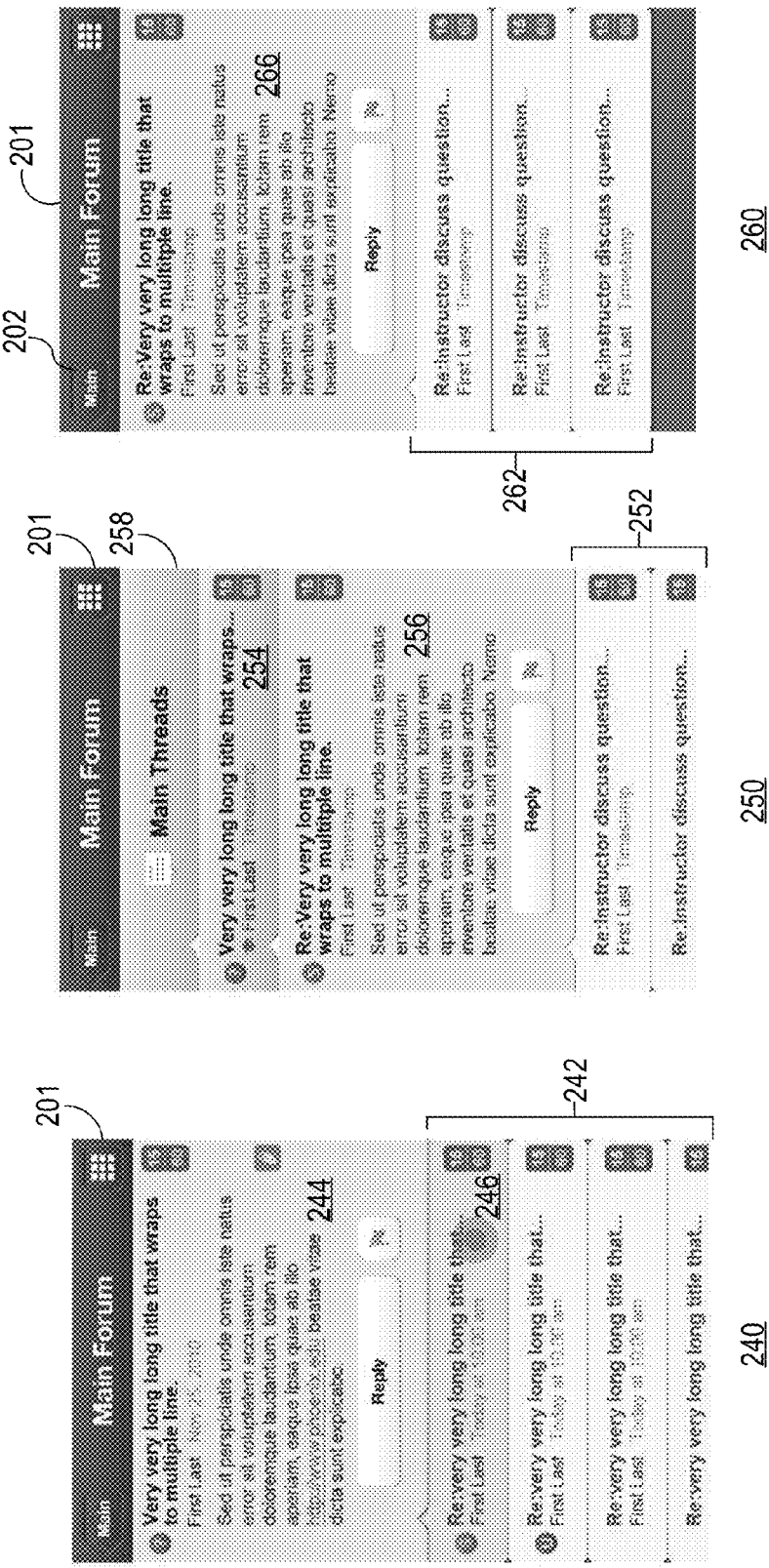
Figure 2C:
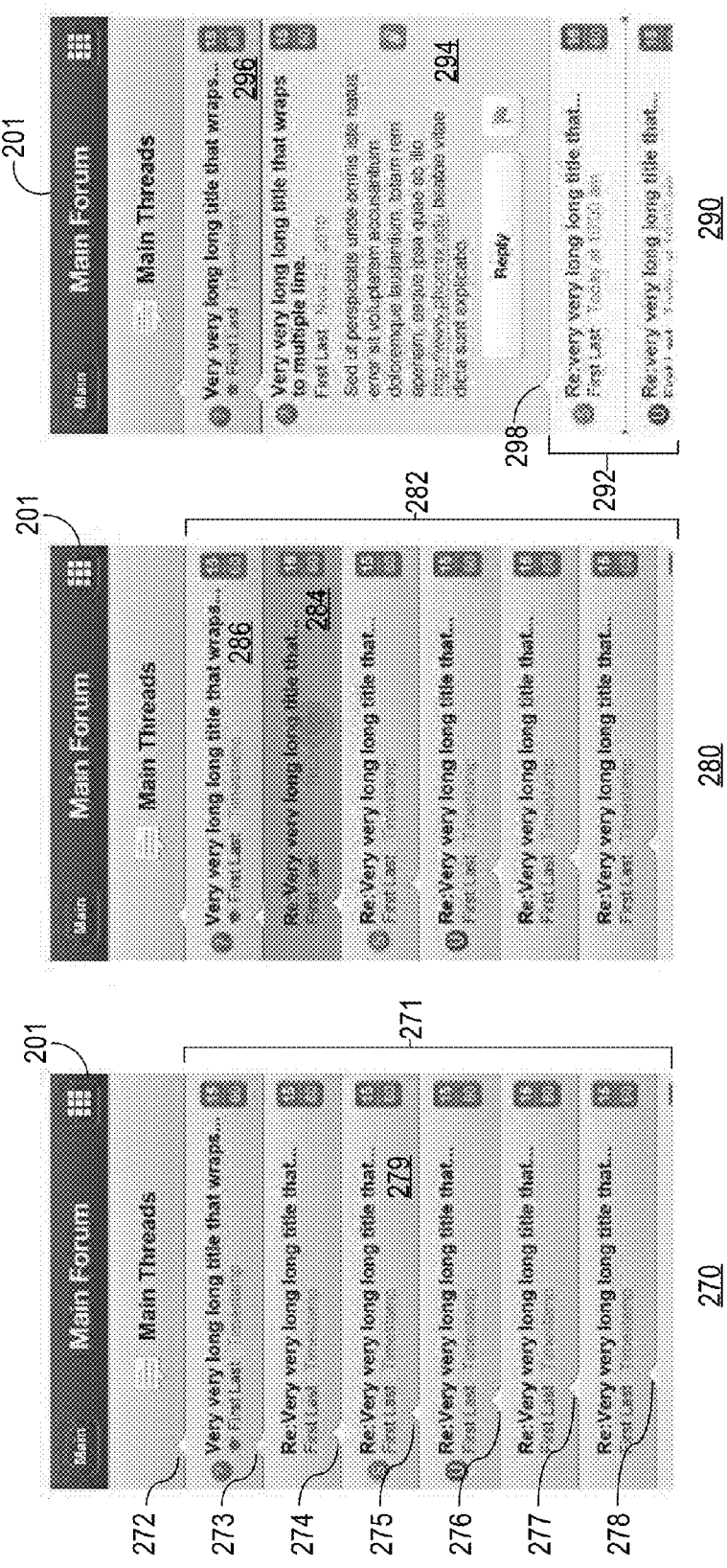

FIGS. 2A-2C illustrate example graphical user interfaces (GUIs) 210-290 for displaying and facilitating navigation of hierarchically-organized sets of messages in a relatively small visual space, where the GUIs allow a user to ascertain the position in the hierarchy of a particular message and other context information for the message. GUIs 210-290 may be used with a small display screen, such as a mobile device display screen, or in other situations where viewing and navigating a hierarchically-organized set of messages with a relatively small user interface is advantageous. For example, a relatively small user interface may be advantageous when a display device has a low resolution, whether or not the surface area of the display is relatively large.

Figure 3:
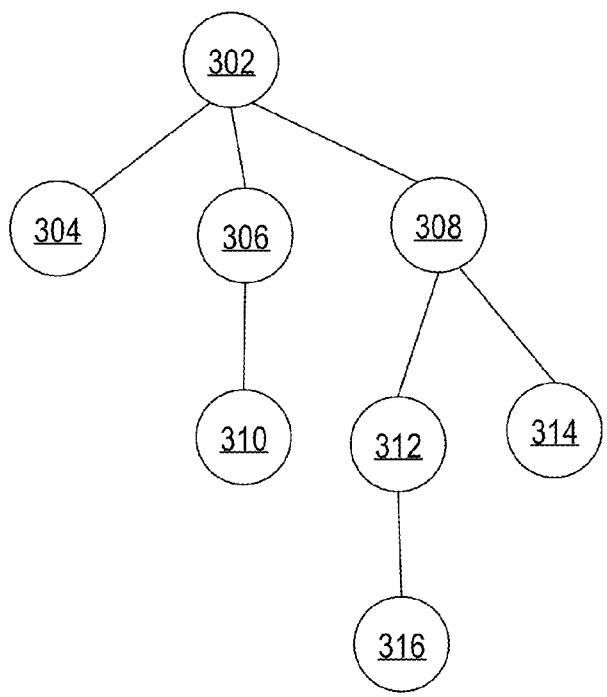
FIG. 3 illustrates an example hierarchy of messages.

A hierarchically-organized set of messages includes a root message to which all other messages in the hierarchy are either direct or indirect replies. FIG. 3 illustrates an example hierarchy of messages 300. Message 302 is the root node of hierarchy 300 and messages 304, 306, and 308 are known as direct children of message 302 because there are no other messages on respective paths between message 302 and messages 304-308 in the hierarchy. Messages 310, 312, 314, and 316 are indirect children of message 302 because at least one other message is present on respective paths between message 302 and messages 310-316 in the hierarchy.

A message hierarchy is composed of levels of messages, where messages from a particular level have the same depth in the hierarchy. Particular messages are on the same level if the messages have the same number of messages in respective paths between each respective particular message and the root message. For example, message 302 is the only message on a first level of the hierarchy because it is the only message that has zero nodes on the path between the message and the root node, i.e., it is the root node. Messages 304, 306, and 308 are on a second level of the hierarchy because they all have one node on a path between the messages and the root node, i.e., message 302. Thus, messages 310, 312, and 314 are on a third level of the hierarchy and message 316 is on a fourth level of the hierarchy.

In one embodiment, a hierarchically-organized set of messages represents a discussion thread. The root message of a discussion thread is the initiating message for the thread. In other words, all messages in the hierarchy for a discussion thread, other than the root message, are either direct or indirect children of (and replies to) the root message. The direct child of a particular message in a discussion thread hierarchy is a reply message to the particular message. While reference is made to discussion threads herein, embodiments are not limited to discussion threads.

Returning to discussion of FIG. 2A, GUI 210 illustrates a list of root messages 212, where each of the root messages is the root of a respective hierarchy of messages. Information for a root message of a hierarchy of messages may be used to identify the hierarchy of messages. For example, messages 212 may be initiating messages for a set of discussion threads relating to a particular topic. Because messages 212 all relate to the particular topic, they are grouped together into a list in GUI 210, which may be referred to as a "main threads" page. A GUI that was reached via GUI 210 may include a shortcut to GUI 210 in toolbar 201, see, e.g., "main" return mechanism 202 in GUI 220.

GUI 210 includes representations of messages, e.g., the visual representations of messages 212 in GUI 210. A message representation includes information from the associated message. For example, a message representation for a particular message may include one or more words from a title of the message, date and time information known as a timestamp, author information for the message, representations of metadata associated with the message, and/or words from the body of the message. Metadata for a message may include labels such as user-flagged, important, unimportant, substantive, question, read, unread, message count (described in further detail below), attachments, student type, location, message type, owner type, etc. Herein, reference to a message is also a reference to the visual representation of the message, unless explicitly stated otherwise.

Message Counts

As shown in GUI 210, a message's visual representation, e.g., message 214, may include a message count 216 that includes a top number and a bottom number. In one embodiment, the top number of message count 216 indicates unread messages associated with message 214, including unread messages in the direct and indirect children of message 214. In this embodiment, the bottom number indicates total messages in a subtree of the hierarchy rooted at message 214. In another embodiment, a message count associated with a root message represents unread messages and total messages for the entire hierarchy. In this embodiment, the message count for a message that is not a root message indicates unread messages and total messages among only the direct children of the message. Thus, message count 216 provides context information for message 214 and its associated message hierarchy.

Read/Unread Indicators

Furthermore, a message's representation may include one or more visual cues that indicate whether the message is read or unread. Such visual cues may include font type, font color, font style, icons, or any other visual cue. For example, if a message is unread, the title of the message may be bolded, and if a message is read, the title of the message may be unbolded and/or a color that is different than the color of an unread message's title. In an embodiment, display generator client 112 displays, by default, more information for an unread message than for a read message. For example, in messages 232 of GUI 230, read messages may be displayed with a "collapsed" level of detail and unread messages may be displayed with an "expanded" level of detail (as described in further detail below).

Displaying and Navigating Through a Selected Hierarchy

A user may select a particular message from messages 212 of GUI 210 to request display of the associated message hierarchy. Mechanisms by which a user may select a message, such as message 214, include tapping on message 214 via a touch screen display, clicking on message 214 using a digital pointer, or selecting message 214 in any other way. In one embodiment, a tap selects message 214 when the surface area involved in the tap is predominantly within a visual area of GUI 210 dedicated to message 214. In other words, the portion of the device designated for a message may include a small buffer around the display area for the message to account for fat finger mistakes.

FIG. 4 illustrates a flowchart 400 for displaying and navigating a hierarchy of messages within a graphical user interface. At step 402, a plurality of messages that belong to a hierarchy of messages is displayed within a graphical user interface of a computing device. For example, in one embodiment, selecting message 214 of GUI 210 causes GUI 230 to be displayed. Specifically, upon detecting selection of message 214, display generator client 112 causes client device 110 to display GUI 230 at display device 150. GUI 230 includes messages 232 and message 234 from the message hierarchy associated with message 214. Message 234 is the same as message 214, only represented with different levels of detail. In one embodiment, GUI 230 is automatically displayed after GUI 220 is displayed, as explained in further detail below.

The Focal Message

In one embodiment, a focal message is a message displayed in a GUI with distinguishing visual features and/or more detail shown than is shown for any other messages in the GUI. For example, the representation of message 234 (the current focal message of GUI 230) includes, among other things, the entire body of message 234 and the entire title of the message. In contrast, the representations for messages 232, none of which are selected as the focal message, include only as much of the titles of the respective messages as will fit on a single line of text and include no text from the body of the messages. Further, message 234 has a slightly different background color than messages 232 and is at the top of the list of messages, which are distinguishing visual features of focal message 234.

Further visually distinguishing the focal message, message 234 also includes controls for the user to add information to the focal message, including a reply button 236, and a flag button 238. When a user activates reply button 236, display generator client 112 provides a GUI form in which the user may input information for a reply message to the focal message. If the user saves information for a reply message to message 234, the reply message is included in the hierarchy as a child message of message 234. Also, a representation of the saved reply message may be included in GUI 230, e.g., as part of messages 232. Other features may be used to distinguish a focal message from other represented messages.

At step 404, a first message, of the plurality of messages, and a first set of messages that reside below the first message in the hierarchy are displayed while the first message is selected as a focal message. For example, in GUI 230, message 234 is currently selected as the focal message, and is displayed with messages 232. Messages 232 reside below message 234 in the associated hierarchy of messages. In one embodiment, messages 232 are direct children of message 234. In another embodiment, messages 232 include both direct and indirect children of message 234. For example, GUI 230 may include messages that are located two or three levels below the focal message. In an embodiment, indirect children of a focal message are displayed when the indirect children satisfy pre-defined criteria. Such pre-defined criteria may include having a timestamp within a particular amount of time of the current time, e.g., a day, or being associated with particular metadata, including being labeled as user-flagged, important, or substantive. In an embodiment, the pre-defined criteria are configurable by a user.

Selecting a Different Focal Message

At step 406, it is determined whether selection of a second message, from the first set of messages, as the focal message is detected. For example, GUI 240 (FIG. 2B), which shows the same messages as GUI 230, illustrates such a selection. In the example of GUI 240, display generator client 112 detects user selection of message 246, mechanisms for which are described in further detail above. Such selection of message 246 indicates the intention of a user to make message 246 the focal message.

At step 408, the second message is established as the focal message. To illustrate, display generator client 112 establishes message 246 as the focal message, e.g., by recording selection of message 246 at information cache 118. Messages 256 and 266 represent the same message as message 246.

At step 410, display of all messages, from the first set of messages, other than the focal message and a second set of messages is ceased, wherein all messages in the second set of messages reside below the second message in the hierarchy. To illustrate, after establishing message 246 as the focal message, display generator client 112 causes GUI 240 to cease to be displayed and causes GUI 260 (FIG. 2B) to be displayed. GUI 260 displays focal message 266 and messages 262, which reside below focal message 266 in the hierarchy. Thus, in GUI 260, only focal message 266 and messages that are children (either direct or indirect) of message 266 are displayed.

Return to Previous Focal Message

Display generator client 112 may provide a mechanism by which a user may return to the previous focal message that was selected prior to the current focal message. In embodiments, a mechanism provided to a user is associated with a GUI element such as a button, toggle, drop down list, selectable text, etc., the triggering input for which is activation of the GUI element. When a mechanism is triggered by a triggering input, the mechanism performs the function assigned to the mechanism.

In embodiments, a mechanism provided to a user to perform a particular function is not associated with a GUI element, or is not associated with a GUI element that is designated to perform the function assigned to the mechanism, and may be triggered by any number of triggering inputs. A triggering input may be a particular motion detectable by a computing device such as shaking the computing device or a component of the computing device, moving the computing device or a component of the computing device quickly to the left or the right, rotating the computing device on a horizontal or vertical axis, etc. Also, a triggering input may be a verbal command, user interaction with a touch screen such as a tap, swipe, double swipe, etc., user interaction with a computing device via input devices, or any other kind of interaction detectable by a computing device. Input devices may be any manner of peripheral device through which a user may input information to a computing device, such as a mouse, joystick, motion detector, etc., communicatively coupled to the computing device. Components of a computing device include any portion of a computing device and any manner of peripheral device communicatively connected to the computing device.

In an embodiment, to implement a mechanism by which a user may return to the previous focal message that was selected prior to the current focal message, display generator client 112 maintains a history of identifiers of one or more focal messages that have been selected by a user. In response to a user triggering the mechanism by which the user may return to a previous focal message, display generator client 112 automatically sets one or more of the historical focal messages as the current focal message, and displays the newly selected focal message as described herein.

Return to a List of Messages

In one embodiment, display generator client 112 provides a return mechanism, e.g., return mechanism 202 of GUI 260, by which a user may return to a list of messages via which the user navigated to the current focal message. In the example of GUI 260, activation of return mechanism 202 causes display generator client 112 to display GUI 210 (FIG. 2A), which is the list of messages via which the user navigated to focal message 266 of GUI 260.

Displaying Message Context

In one embodiment, display generator client 112 displays context information for the focal message. Such context information may include information about messages in a path from the focal message to the root message of the hierarchy (parent message context information) located laterally above information displayed for the focal message. Parent message context information orients a user as to the focal message's relative position in the hierarchy.

For example, GUI 250 of FIG. 2B illustrates parent message context information for a focal message 256. Focal message 256 is a direct child of root message 254 in the message hierarchy, and thus only one message is in the path between the focal message (256) and the root message (254) of the hierarchy—the root message itself. Thus, GUI 250 displays information for root message 254 as parent message context information since message 254 is the only parent message of focal message 256 in the hierarchy.

In one embodiment, context information for a focal message also includes a mechanism that functions as a shortcut to a list of available hierarchies of messages, e.g., a "main threads" page. In embodiments, such shortcuts may cause any appropriate GUI to be displayed, including a main menu GUI or any other GUI displaying a list of messages. GUI 250 displays a shortcut 258, activation of which causes display generator client 112 to display GUI 210 (FIG. 2A), which in turn allows a user to navigate among available message hierarchies in the forum. Displaying shortcut 258 laterally above any displayed parent message context information serves to further orient the user, indicating that the top of the list of parent messages has been reached and that the user may choose another hierarchy of messages to navigate via the shortcut.

In one embodiment, one or more pieces of context information for a focal message (including a shortcut to a list of message hierarchies and parent message context information) may be briefly displayed, for a predetermined amount of time, in response to selection of a message as the focal message. Displaying context information for a brief amount of time allows a user to see the context information without burdening the screen with information that may not be needed for navigation, as described in further detail below. Thus, display generator client 112 makes the context information available while focusing the display space on the focal message and replies thereto.

To illustrate, in response to a user selecting message 246 of GUI 240 as the focal message, display generator client 112 causes GUI 250 to be displayed before displaying GUI 260. After a pre-determined amount of time, e.g., two seconds, GUI 250 is replaced with GUI 260, which has the same focal message as GUI 250, but does not show shortcut 258 and does not show any parent message context information for the focal message. In an embodiment, an animation transitions GUI 250 to GUI 260. For example, an animation may give a user the impression that the shortcut and parent message context information slide, together, under toolbar 201.

GUI 220 of FIG. 2A is another example of displaying context information for a focal message, as described above. Focal message 224 of GUI 220 is the root message of a message hierarchy, and therefore, GUI 220 does not include representations of parent messages. However, GUI 220 includes shortcut 226 to GUI 210, which indicates to a user that the focal message has no parent messages and that the user has the option of navigating to another hierarchy of messages via shortcut 226. When a user activates shortcut 226, display generator client 112 to ceases displaying GUI 220 and displays GUI 210. As with GUI 250, GUI 220 may be displayed for a pre-determined amount of time in response to message 214 being selected as the focal message from GUI 210. After the pre-determined amount of time, e.g., two seconds, GUI 220 is replaced with GUI 230, which has the same focal message as GUI 220, but does not show shortcut 226. As with GUIs 250 and 260, an animation may transition GUI 220 to GUI 230.

Revealing Messages

In an embodiment, once the shortcut and any parent message context information have been hidden from view, apparently under toolbar 201, a user may drag the list of messages displayed in GUI 260 (FIG. 2B), e.g., by sliding an object such as a finger, stylus, pen cap, etc., down the visual display starting anywhere on messages 266 or 262, to drag the parent messages and shortcut back into view. A user may also position a digital pointer anywhere on messages 266 or 262 and use the pointer to drag the parent messages and shortcut back into view. Also, a user may scroll the list of messages up using a scrollbar (not illustrated in GUI 260) to reveal the context information. When the parent messages and shortcut are revealed, e.g., as in GUI 250, a user may select any one of the displayed messages or activate shortcut 258.

Selecting a Parent Message as the Focal Message

Selecting a parent message, such as message 254 of GUI 250, causes display generator client 112 to establish message 254 as the focal message. To illustrate, GUI 270 of FIG. 2C illustrates a long list of parent messages 271. Off the screen, laterally under messages 271, is a focal message that is more than six levels deep in the hierarchy. In GUI 280 of FIG. 2C, which illustrates the same messages as GUI 270, a user selects message 284 as the focal message, which is in the middle of the list of parent messages 282. In one embodiment, in response to detecting selection of message 284 as the focal message, display generator client 112 establishes message 284 as the focal message and displays GUI 290 of FIG. 2C.

The focal message 294 of GUI 290 is the same message as message 284 of GUI 280. GUI 290 also displays child messages 292 of message 294, as well as a parent message 296 of the focal message. As previously described, the context information for message 294 (including the "main threads" shortcut and parent message context information) may be displayed for a predetermined amount of time before it is hidden from view.

Shortcuts into a Hierarchy of Messages

Context information for a focal message is particularly helpful when a user jumps to a message without navigating to the message from the root message of the associated hierarchy. For example, display generator client 112 may provide a user with a shortcut to a particular message within a hierarchy (a "message shortcut"). Activation of a message shortcut establishes the particular message referred to by the shortcut as the focal message, and display generator client 112 displays the newly established focal message and context information for the message as described above.

Context information displayed for the message established via a message shortcut, including parent messages, child messages, visual depth indicators, and other context information allows a user to quickly orient herself as to the relative position of the message within its message hierarchy. Also, parent message context information allows a user to view messages to which the current focal message is a reply and to select a parent message for viewing as a focal message, if desired. Further, context information such as message count 216, and other visual cues that give further information about metadata and read/unread status of the focal message and of other displayed messages allow a user to quickly ascertain the state of messages in the hierarchy.

In one embodiment, a message shortcut may be included in the text of a message. In another embodiment, a message shortcut may be included in a list of shortcuts compiled by display generator 122 or display generator client 112. Such a list of shortcuts may represent a list of messages that have been flagged by a user, recently accessed by the user, unread by the user, sent by the user, messages marked as substantive, all messages authored by a particular user, messages that match certain criteria entered by a user, etc.

In yet another embodiment, a message shortcut may appear in a notification screen that displays information about the existence of a particular message. For example, a user may request notifications for: replies to messages that the user has authored; messages posted by a certain author; messages that are newly marked as substantive by any user, or by a user of a particular set of users (e.g., teachers); changes to messages from a certain group of message hierarchies, e.g., relating to a particular topic; replies to messages that the user has flagged; etc. Such an alert may appear: as a new GUI that replaces the GUI that is currently displayed by display generator client 112; as a pop up window over the top of the current GUI; in a particular portion of the current GUI; or in any other way. A message shortcut may display one or more pieces of information from the associated message.

Visual Depth Indicators

GUI 270 of FIG. 2C illustrates visual depth indicators 272-278 associated with message representations. Visual depth indicators 272-278 indicate the depth in the hierarchy of the associated messages. In the embodiment illustrated by GUI 270, visual depth indicators 272-278 are deformations, forming a rough triangle, in a top border of a message representation. The deformation for a message is of a relatively small width compared to the width of the top border of the message. Further, the triangular space created by the deformation is a different color than the rest of the message representation, further distinguishing the visual depth indicator. Visual depth indicators may be any visual feature, such as the triangular deformations in GUI 270, which are horizontally spaced to indicate a depth of an associated message in a message hierarchy. For example, a visual depth indicator may be an icon that is not a deformation of a border of a message representation such as a small circle that appears to hover over the top or bottom border of a message representation or anywhere on the message representation.

FIG. 5 illustrates a flowchart 500 for associating visual depth indicators with message representations. At step 502, a plurality of messages that belong to a hierarchy of messages are displayed within a graphical user interface of a computing device, wherein the plurality of messages includes messages from two or more different depths in the hierarchy of messages. To illustrate, display generator client 112 of client device 110 displays GUI 270 of FIG. 2C. GUI 270 displays parent messages 271, which belong to a hierarchy of messages and are from various different depths in the hierarchy. Messages in a hierarchy on a direct path between a particular message and a root node of the hierarchy necessarily reside at different depths in the hierarchy.

At step 504, message text that is displayed for each message of the plurality of messages is positioned at a uniform position along a horizontal axis. For example, the representations of each of messages 271 display text of a title for the corresponding message. Display generator client 112 aligns the title text in each of messages 271 at the same position along the horizontal axis of GUI 270, e.g., 20 pixels from the extreme left point of the horizontal axis of GUI 270 or 5% of the length of the horizontal axis of GUI 270.

At step 506, a visual depth indicator for each message of the plurality of messages is positioned on the horizontal axis at a depth-indicating position that is dictated by the depth of the corresponding message within the hierarchy, wherein the visual depth indicator is not part of message text. For example, display generator client 112 displays a visual depth indicator (272-278) for each of messages 271, where visual depth indicators 272-278 are not part of text displayed for the corresponding messages. By separating the text of a message from the visual depth indicator for the message, no horizontal space that could otherwise be used for message text is used in indicating the hierarchical depth of the message.

In the embodiment illustrated by GUI 270, visual depth indicator 272 (associated with the root message of the hierarchy) is aligned at a first point on the horizontal axis of GUI 270 and visual depth indicator 274 (associated with a direct child message of the root message) is aligned at the same point on the horizontal axis. In this embodiment, a visual depth indicator for a root message and visual depth indicators for direct children of the root message are aligned at the same point on the horizontal axis. Also in this embodiment, visual depth indicators 274-278, associated with indirect child messages of the root message of the hierarchy, are not aligned with the position on the horizontal axis of the visual depth indicator for the root message. In another embodiment, visual depth indicators for both direct and indirect children of the root message are not aligned with a visual depth indicator for the root message of the hierarchy, as described in further detail below.

A position for a visual depth indicator may be determined by (a) multiplying a number based on the depth of an associated message (a depth number) with (b) a pre-determined measurement representing a length of the horizontal axis (an offset measurement) and (c) adding the resulting measurement to a measurement representing the horizontal position of a visual depth indicator for the root message (d) to produce a resultant position measurement for the visual depth indicator. The visual depth indicator is then placed in visual association with the associated message at a position on the horizontal axis represented by the resultant position measurement for the visual depth indicator.

The resultant position measurement may be used as an offset from any point on the horizontal axis of a GUI displaying the associated message. In embodiments, the resultant position measurement is an offset from the extreme left point of such a horizontal axis. A measurement representing a length of the horizontal axis or a position of a visual depth indicator may be a number of pixels to be measured from a certain point on a GUI, or may be a percentage of the available resolution of a particular display.

Given that the depth level of a root message is 1, the depth number may be the depth level of the associated message minus one "depth-1" (in an embodiment where none of the visual depth indicators for child messages of a root message are vertically aligned with a visual depth indicator for the root message) or may be the depth level of the associated message minus two "depth-2" (in an embodiment where visual depth indicators for direct child messages of a root message are vertically aligned with a visual depth indicator for the root message). If the depth number is depth-2, any negative depth numbers are set to 0.

To illustrate determining a resultant position measurement for a visual depth indicator, an example is provided for calculating the resultant position measurement for visual depth indicator 274 of GUI 270, which is associated with message 279. In this example, the position measurement for visual depth indicator 272 (for the root message of the hierarchy) is 20 pixels, and the pre-determined offset measurement is five pixels. Taking the depth number to be depth-2, display generator client 112 multiplies the depth number (which is based on the depth level (three) for message 279, depth (3)–2=1) with the offset measurement (five pixels), which results in five pixels. This resulting measurement is added to the position measurement for the root message visual depth indicator (20 pixels). Thus, the resultant position measurement for visual depth indicator 274 is 25 pixels. In this example, visual depth indicator 274 is placed 25 pixels from the extreme left point of the horizontal axis of GUI 270.

In one embodiment, the offset measurement is a pre-set measurement, e.g., five pixels. However, if a focal message is 99 levels deep in the hierarchy, then display generator client 112 is required to represent 100 hierarchical levels or more with visual depth indicators. Thus, in another embodiment, the offset measurement is determined based on the number of hierarchical levels that are represented by the messages to be displayed. Thus, in this embodiment, the offset measurement is scaled to accommodate for a variable number of levels in the hierarchy to be represented by visual depth indicators.

In an embodiment, to calculate a scaled offset measurement, display generator client 112 determines a length of horizontal axis across which visual depth indicators may be displayed. For example, GUI 270 may be 450 pixels wide and may accommodate visual depth indicators in 400 of those pixels. Display generator client 112 then determines an offset measurement for the visual depth indicators to be displayed in GUI 270 by dividing the length of horizontal axis that may accommodate visual depth indicators (e.g., 400 pixels) by a total number of depth levels to be represented (e.g., 100 levels), resulting in a scaled offset measurement (e.g., 4 pixels). In another embodiment, display generator client 112 calculates a scaled offset measurement by representing the scaled offset measurement as a percentage of the length of the horizontal axis. In this embodiment, display generator client 112 divides the percentage of the horizontal axis dedicated to the visual depth indicators (e.g., 85%) by the number of depth levels to be represented to produce the scaled offset measurement. Further, a scaled offset measurement maybe based on the number of depths represented by messages actually displayed on the screen, rather than on a total number of depths of all of the messages that are available to be rendered in connection with a particular focal message.

Messages on the same level of a message hierarchy have visual depth indicators that are located at the same point on a horizontal axis of the GUI, i.e., the visual depth indicators are vertically aligned. As such, all direct child messages of a particular message will have visual depth indicators aligned to the same horizontal point. Thus, in an embodiment in which only direct replies to a focal message are displayed by display generator client 112, only one visual depth indicator is used to indicate the depth of all of the reply messages, e.g., visual depth indicator 298 of GUI 290.

Navigating the Hierarchy

Figure 7A:
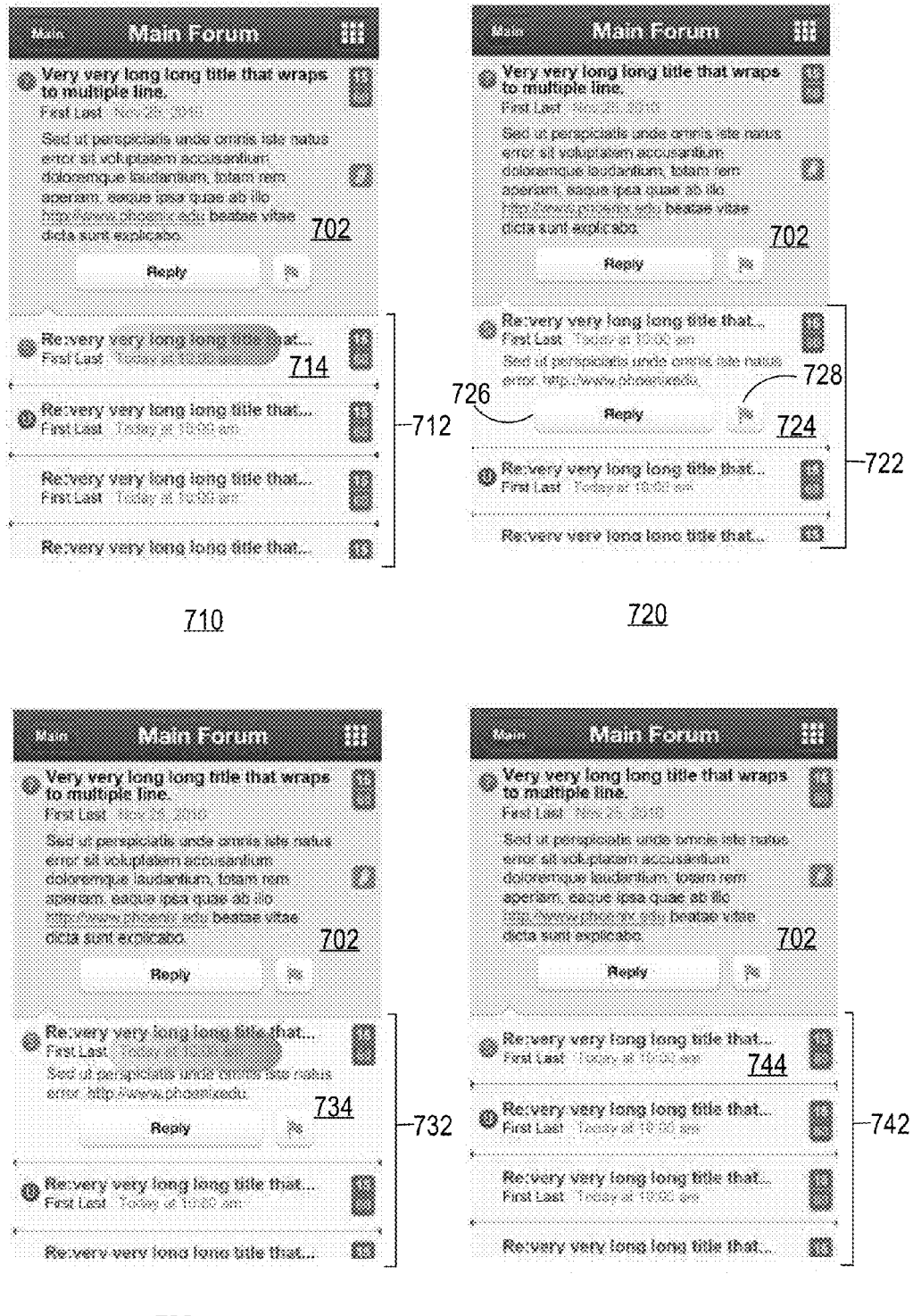
FIGS. 7A and 7B illustrate navigation of graphical user interfaces that display hierarchical message data.
Figure 7B:
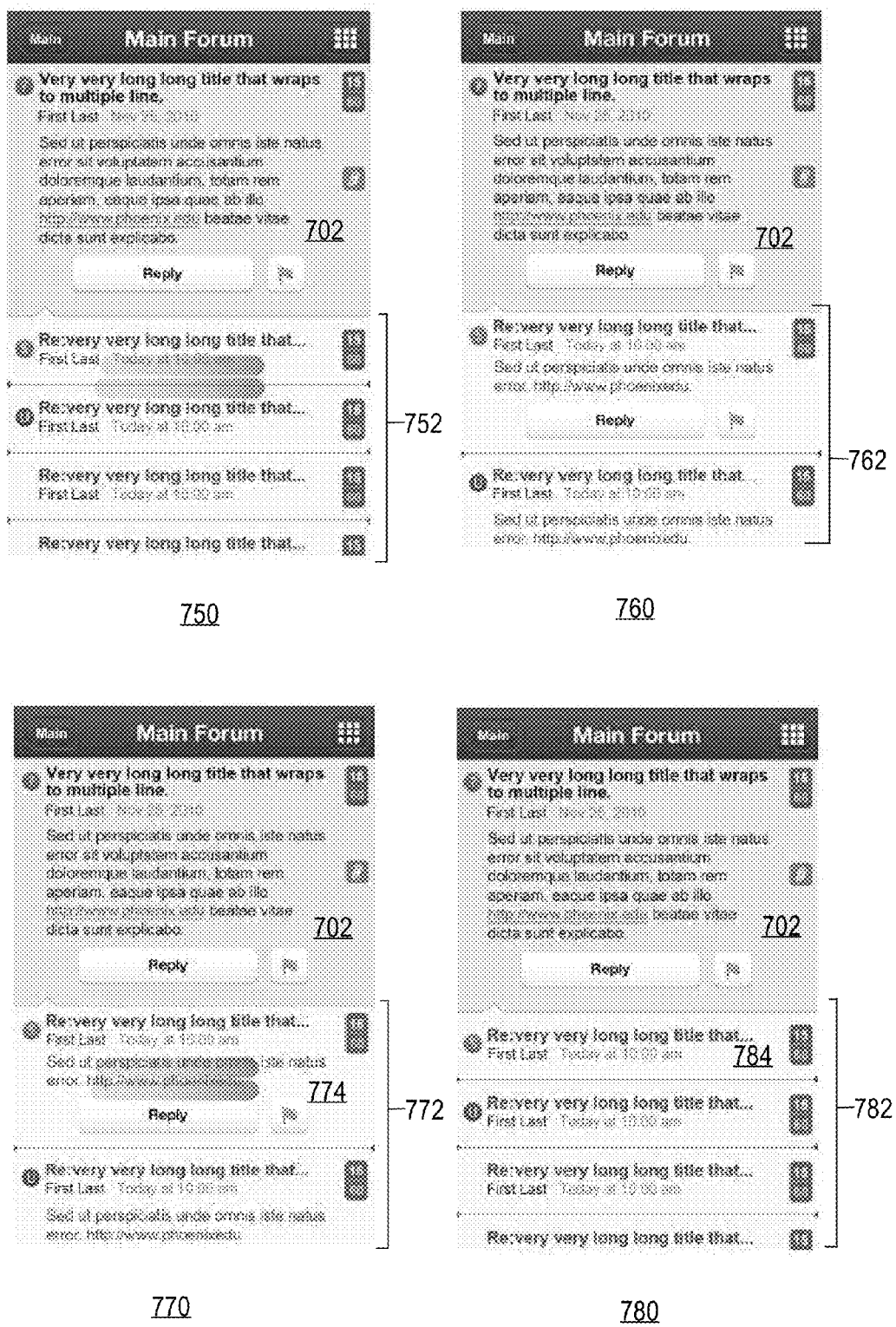

In embodiments, triggering inputs detected by display generator client 112 further facilitate navigating information displayed by display generator client 112. FIG. 6 illustrates a flowchart 600 for navigating a set of messages using triggering inputs for a computing device. At step 602, a first set of messages is displayed within a graphical user interface on a computing device. For example, display generator client 112 displays GUI 710 of FIG. 7A that includes messages 712. FIGS. 7A and 7B illustrate navigation of GUIs 710-780, which display hierarchical message data. GUIs 710-740 have the same focal message, message 702, and include a list of reply messages to focal message 702.

At step 604, a first triggering input that targets a particular message of the first set of messages is detected. The first triggering input represents a particular kind of triggering input, such as a swipe. A swipe is a sweeping stroke across a graphical user interface. A user may swipe a GUI displayed on a touch screen by placing an object, such as a finger, stylus, pen lid, etc., against the touch screen and sweeping the object across the GUI displayed on the touch screen. As another example, a user may swipe a GUI using a mouse by holding down a button on the mouse when the electronic cursor is on the GUI and sweeping the mouse across the GUI. Further, a user may swipe a GUI displayed on a device that detects light by shining a light on the GUI and sweeping the light across the GUI. Furthermore, a user may swipe a GUI using a mouse track pad by placing an object on the mouse track pad when the electronic cursor is over the GUI, and sweeping the object across the track pad to sweep the electronic cursor across the GUI. The first triggering input may be any kind of triggering input within embodiments of the invention.

In one embodiment, a single swipe is distinguished from a double swipe. A single swipe is a swipe that is performed using only one object, e.g., one finger or one pen lid. A double swipe is a swipe that is performed using two objects simultaneously, e.g., moving two fingers across a touch screen, etc.

In an embodiment, the first triggering input targets the particular message without activating any visible control, e.g., GUI element, displayed within the graphical user interface in visual association with the representation of particular message. In other words, the first triggering input triggers a mechanism that is not assigned to be the function of any element of the GUI.

For an example of step 604, display generator client 112 detects a swipe across a portion of GUI 710 on which message 714 is displayed, where GUI 710 is displayed at display device 150. In this example, the swipe is a triggering input that targets message 714 because surface area of the swipe is located on the portion of GUI 710 on which message 714 is displayed. In one embodiment, a swipe is only considered to be across a portion of the device on which message 714 is displayed if the swipe does not go outside of the area of GUI 710 dedicated to displaying message 714. In another embodiment, a swipe is considered to be across a portion of the device on which message 714 is displayed if the swipe is substantially within the area of GUI 710 dedicated to displaying message 714, e.g., if a majority (more than 50%) of the area of a swipe is on message 714.

A Triggering Input to Change Detail Level of a Message

Various actions may be triggered in response to detecting the first triggering input, e.g., a swipe type of triggering input, on a message. In one embodiment, a first triggering input that targets a message triggers a change in the amount of detail in which the message is displayed. For example, at step 606, in response to detecting the first triggering input, it is determined whether the particular message is currently displayed in the graphical user interface at a first level of detail or a second level of detail. Continuing with the example given in connection with step 604, when display generator client 112 detects the swipe on message 714, display generator client 112 determines whether message 714 is displayed in GUI 710 at a first level of detail or a second level of detail where the second level of detail is more detailed than the first level of detail.

A reply message to a displayed focal message may be displayed with a "collapsed" level of detail (e.g., the first level of detail) or an "expanded" level of detail (e.g., the second level of detail). An "expanded" level of detail includes more detail than a "collapsed" level of detail. In one embodiment, both the "collapsed" and "expanded" levels of detail have less detail than detail shown for a focal message. For example, GUI 710 illustrates a "collapsed" representation of message 714 and GUI 720 illustrates an "expanded" representation of the same message, at message 724. A "collapsed" message may include at least a portion of the message title, an author, a time stamp, and one or more indicia of metadata. An "expanded" message may include all of the information of a "collapsed" message plus at least a portion of the message body text. Also, as shown in GUI 720, an "expanded" message may include a reply mechanism 726 for posting reply messages to expanded message 724 and a flag mechanism 728 for flagging expanded message 724. In one embodiment, any message in messages 712 of GUI 710 that has not yet been read by the user is displayed with an "expanded" amount of detail by default when message 702 is displayed as the focal message.

At step 608, responsive to the particular message being currently displayed in the graphical user interface at the first level of detail when the first triggering input is detected, the particular message is caused to be displayed at the second level of detail. To illustrate in the example of GUI 710, display generator client 112 determines that message 714, on which a swipe was detected, was displayed with a "collapsed" (or first) level of detail when the swipe was detected. As a result, and as illustrated by GUI 720, display generator client 112 displays message 724 at an "expanded" (or second) level of detail.

At step 610, responsive to the particular message being currently displayed in the graphical user interface at the second level of detail when the first triggering input is detected, the particular message is caused to be displayed at the first level of detail. To illustrate, display generator client 112 detects a swipe across message 734 of GUI 730 (FIG. 7A) and determines that message 734 is displayed at an "expanded" level of detail. In response, display generator client 112 displays message 744 of GUI 740 at a "collapsed" level of detail, where message 744 represents the same message as message 734.

A first triggering input that targets a particular message, as described in connection with flowchart 600, does not affect other messages displayed with the particular message. For example, the swipe detected across message 714 increases the level of detail at which message 714 is displayed (at message 724), but does not affect the level of detail with which focal message 702 and messages 722 (other than message 724) are displayed. Furthermore, in one embodiment, a first triggering input that targets a particular message does not cause the particular message to be established as a focal message.

A Triggering Input to Change Levels of Detail of Multiple Messages

A second triggering input (of a different type than the first triggering input described above) may be used to expand and contract the levels of detail of multiple messages displayed by display generator client 112. In an embodiment, such a second triggering input is a double swipe-type triggering input that targets one or more messages displayed by display generator client 112. However, the second triggering input may be any kind of triggering input within embodiments of the invention. In one embodiment, a double swipe targets one or more messages displayed by display generator client 112 when the double swipe is on a portion of a GUI that displays the one or more messages. For example, GUI 750 of FIG. 7B illustrates a double swipe that targets one or more of messages 752. Messages 752, 762, 772, and 782 of FIG. 7B represent reply messages for the same focal message 702.

Second triggering inputs are alternatively treated as "expanding" second triggering inputs and "collapsing" second triggering inputs. That is, a second triggering input that immediately follows an expanding second triggering input is treated as a collapsing second triggering input. Conversely, a second triggering input that immediately follows a collapsing second triggering input is treated as an expanding second triggering input.

According to one embodiment, in response to detecting a second triggering input, display generator client 112 determines whether the second triggering input is an expanding second triggering input or a collapsing second triggering input. If the second triggering input (illustrated as a double swipe by GUI 750) is an expanding second triggering input, then display generator client 112 displays at an "expanded" level of detail any of messages 752 that were displayed at a "collapsed" level of detail at the time of the expanding second triggering input, as illustrated by messages 762 of GUI 760.

When display generator client 112 detects the next second triggering input, illustrated in GUI 770 as a double swipe on the portion of GUI 770 that displays messages 772, display generator client 112 determines that the detected second triggering input is a collapsing second triggering input. In response to detecting the collapsing second triggering input, display generator client 112 displays at a "collapsed" level of detail any of messages 772 that were displayed at an "expanded" level of detail at the time of the collapsing second triggering input, as illustrated by messages 782 of GUI 780. The next second triggering input that display generator client 112 detects on reply messages to focal message 702 will be categorized as an expanding second triggering input.

A user may use an expanding second triggering input to expand all replies to a particular focal message and then use first triggering inputs on the expanded replies individually to collapse the detail for each message. Then, if the user again wishes to expand all replies to the particular focal message, the user may again use a second triggering input on the reply messages. However, if this second triggering input is considered to be a collapsing second triggering input, then the "collapsing" second triggering input attempts to collapse all expanded messages. Since there are no expanded messages in the list of reply messages, this "collapsing" second triggering input is to no effect. In this embodiment, the user must use a second triggering input again, which is now considered to be an expanding second triggering input, which will expand the detail of all of the replies to the particular focal message.

To avoid making any second triggering input to no effect in another embodiment, in response to detecting an expanding second triggering input, display generator client 112 determines whether any of messages 752 (GUI 750) are displayed at a "collapsed" level of detail. If not, then display generator client 112 determines that the expanding second triggering input is actually a collapsing second triggering input, and collapses the messages accordingly. Also, in response to detecting a collapsing second triggering input, display generator client 112 determines whether any of messages 752 are displayed at an "expanded" level of detail. If not, then display generator client 112 determines that the expanding second triggering input is actually a collapsing second triggering input, and collapses the messages accordingly. In this embodiment, if a particular second triggering input would take no effect under its original categorization, then the category of the second triggering input is adjusted so that the second triggering input will affect the detail level of the targeted messages.

In one embodiment, a second triggering input affects all reply messages of the focal message. In another embodiment, a second triggering input affects only those reply messages that are actually displayed on display device 150.

Information Cache

Every request made to display generator client 112 has an associated cost, which takes into account the costs for functions that are performed in response to the request. For example, a request made to display generator client 112 to display a particular GUI may involve retrieving information from display generator 122 via network 130 that incurs a first cost component, compiling the information received from display generator 122 into a format needed to render the GUI that incurs a second component cost, and rendering the GUI that incurs a third cost component, etc. The cost components for the steps involved in displaying a requested GUI all contribute to the total cost of displaying the GUI.

To reduce the cost of requests to display generator client 112, display generator client 112 maintains an information cache 118 to store information that has been retrieved from display generator 122 via network 130. Storage of retrieved information at information cache 118 limits the amount of information that needs to be retrieved in the future. Information cache 118 may include message hierarchy data, including the content of messages in the hierarchy, how the messages are interrelated, metadata for the messages and message hierarchy, statistical data associated with the message hierarchy, etc. Information cache 118 may also include the content of various lists of messages as the lists were last retrieved from display generator 122, including lists of messages related by topic, such as messages displayed together in a "main threads" page, or any other kind of list that may be requested by a user.

Once information for a message hierarchy has been retrieved, display generator client 112 only retrieves information that has changed for the hierarchy since the last time data was fetched from display generator 122. In an embodiment where hierarchies of messages are discussion threads, the text for a message that has been added to a hierarchy does not change once the message is authored. Thus, once message text is retrieved from display generator 122, the text may be stored at information cache 118 and need not be transmitted via network 130 again. Updates for an authored message will generally involve only metadata and context information, which may be added to information cache 118 when the updated metadata and context information is retrieved.

Thus, local storage of hierarchical message data in information cache 118 facilitates rapid display of the data when such a display is requested because the cost of retrieving data over network 130 is lessened. When display generator client 112 receives a request to display a list of messages, display generator client 112 sends a request to display generator 122 for updates to (a) the list of messages requested from display generator client 112, and (b) for updates to message hierarchies represented in the list of messages.

FIG. 8 illustrates GUIs 810 and 820 displaying hierarchical message data. GUI 810 displays a list of messages 812 included in a "main threads" page. GUI 820 displays a focal message 824 from a particular message hierarchy with reply messages 822 to the focal message. In GUI 810, each message of messages 812 is from a different message hierarchy. For example, display generator client 112 receives a request, from a user, to display a "main threads" page such as GUI 810 of FIG. 8. In response to the request, display generator client 112 sends a request to display generator 122 for update information for the list of messages for GUI 810 and for updates to the message hierarchies associated with each message to be represented in GUI 810. In return, display generator 122 sends to display generator client 112 information, which has changed since the last time the information was requested, for the list of messages in GUI 810 and for the requested message hierarchies. Display generator client 112 saves the information fetched from display generator 122 in information cache 118 and then formats information from information cache 118 for display at display device 150.

If it is the first time that display generator client 112 has received a request to display GUI 810, which means that display generator client 112 does not have any information for GUI 810 in information cache 118, then display generator 122 sends to display generator client 112 all information to be displayed in GUI 810. Further, display generator 122 will send all information for hierarchies represented in GUI 810 that are not stored in information cache 118 and, for hierarchies represented in GUI 810 that are already in information cache 118, information that has changed since the last time the hierarchies were updated.

In one embodiment, a list of messages displayed by display generator client 112 has an associated page size that limits the number of messages that are retrieved and displayed for the list. In this embodiment, display generator client 112 only fetches, from display generator 122, update information for message hierarchies associated with messages in the list that are to be displayed based on the page size. Thus, the page size limits how much information must be retrieved from display generator 122 via network 130.

In embodiments, a list of messages is organized by reverse chronological order based on timestamps associated with the messages in the list. Timestamps by which messages are ordered may pertain to any feature of a message, including when the message was authored, when the message was assigned particular metadata (flagged, substantive, etc.), when an associated message hierarchy was last modified, when a message in the subtree rooted at the message was last modified, etc.

A page size limits display of a reverse chronologically-organized list of messages to a particular number of messages with the most recent timestamps. Many times, a user is most interested in messages with the most recent timestamps in a list of messages, and, using page sizes, display generator client 112 limits what is fetched from display generator 122 to the most interesting and pertinent information.

In one embodiment, a page size for a message list is stored for each user that accesses the message list. For example, information cache 118 at client device 110 may store the page size for a particular message list for a particular user. The page size may be adjusted at information cache 118, and is not overwritten by data from display generator 122 unless display generator 122 specifically overwrites the data. Page sizes associated with users may also be stored at database 140 for display generator 122.

To determine a number of messages to display for a particular message list, display generator client 112 uses the page size for the particular message list that is recorded for the particular user.

A page size that is initially associated with a particular list of messages is assigned based on a pre-determined page size number that may be stored at display generator 122. For example, it may be determined that users are generally interested in the 25 most recently modified messages. Thus, display generator 122 sets the initial page size for all lists of messages to 25. In another embodiment, display generator 122 stores multiple pre-determined page sizes that are assigned to message lists based on particular features of the various message list. For example, a page size may be assigned to a list of messages based on the topic of the message, on statistical data stored for the list of messages—which may include how frequently new message are included in message hierarchies associated with the list or how often users trigger a mechanism for viewing more messages in the list, etc.

Figure 9:
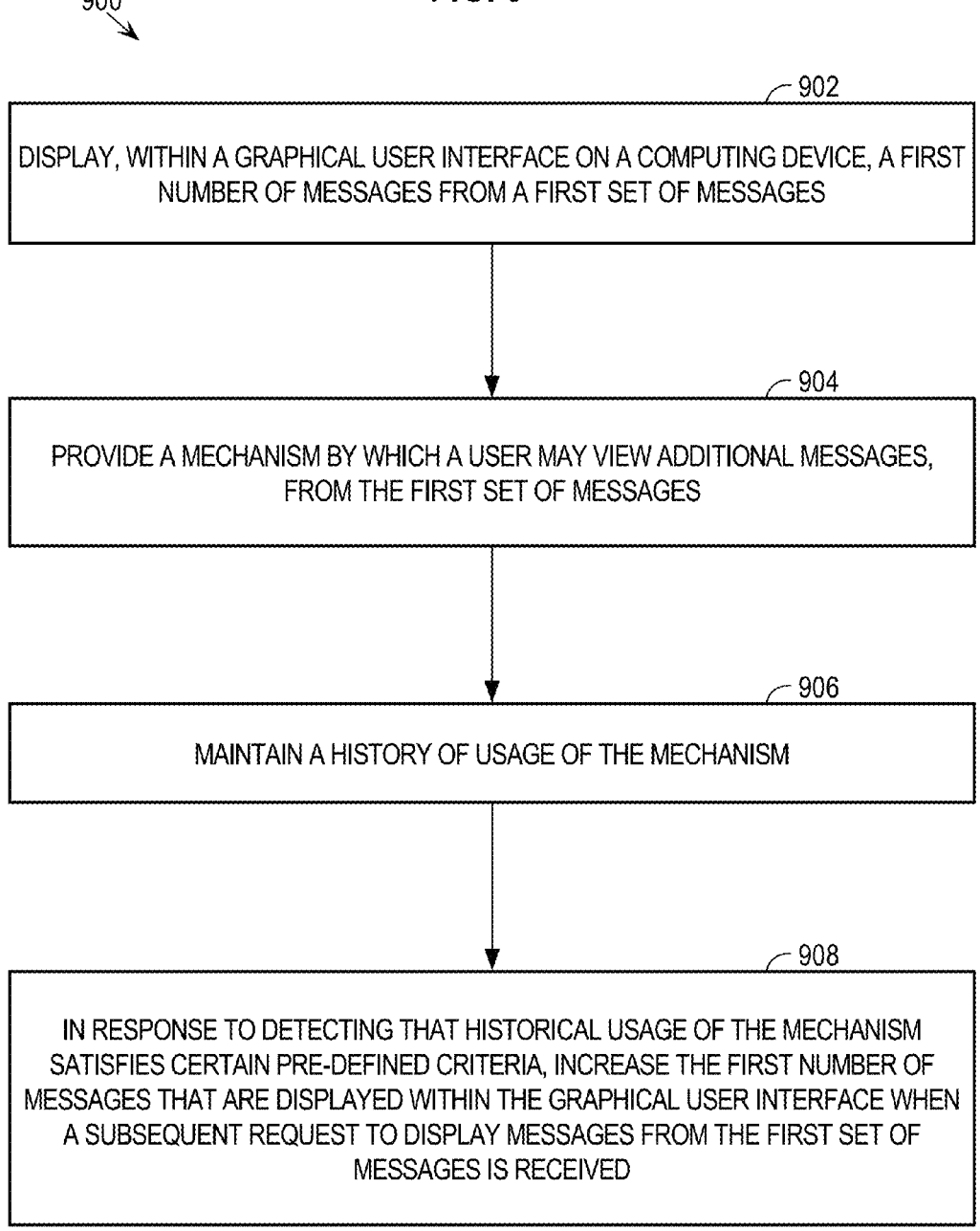
FIG. 9 illustrates a flowchart for implementing a mechanism for viewing more message representations in a list than are originally displayed.

Display generator client 112 may provide a mechanism to allow a user to view more messages of a message list displayed by display generator client 112. FIG. 9 illustrates a flowchart 900 for displaying a quantity of messages in a list, including implementing a mechanism for viewing more messages than are originally displayed. At step 902, a first number of messages from a first set of messages are displayed within a graphical user interface on a computing device. For example, display generator client 112 determines that a page size associated with messages 812 is 25. Though there are 100 messages associated with GUI 810, display generator client 112 displays GUI 810 at display device 150 with only 25 messages, based on the page size for messages 812. The 25 messages may be the 25 most recently modified messages of messages 812 and may be ordered in reverse chronological order.

At step 904, a mechanism is provided by which a user may view additional messages from the first set of messages. For example, display generator client 112 provides a see more button 814 at the end of the limited number of messages 812 displayed at GUI 810. Activation of see more button 814 displays more messages of messages 812, e.g., the next 25 most recently modified messages associated with the list displayed by GUI 810. In response to activation of see more button 814, display generator client 112 requests from display generator 122 any information needed for displaying messages in the list of GUI 810 that is not in information cache 118 and update data for message hierarchies associated with the additional messages to be viewed.

At step 906, a history of usage of the mechanism is maintained. For example, display generator client 112 tracks a number of times the user activates see more button 814. Display generator client 112 may also track a number of times that the user has viewed GUI 810. When a default page size for a particular list of messages is adjusted, display generator client 112 may start a new history of usage of a mechanism for viewing more of the particular list of messages.

At step 908, the first number of messages, which are displayed within the graphical user interface when a subsequent request to display messages from the first set of messages is received, is increased in response to detecting that historical usage of the mechanism satisfies certain pre-defined criteria. For example, display generator client 112 determines that historical usage of see more button 814 satisfies pre-defined criteria when see more button 814 has been activated at least a threshold number of times, e.g., the button has been activated once, or when see more button 814 has been activated at least a threshold number of times within a total number of views of GUI 810, e.g., the button was activated twice in a total of three views of GUI 810.

In response to determining that the historical usage of see more button 814 satisfies pre-defined criteria, display generator client 112 increases the page size associated with messages 812. Display generator client 112 may determine a new page size for messages 812 for a particular user based on the historical usage of see more button 814 recorded for the particular user. For example, if see more button 814 was used to cause 75 total messages from messages 812 to be displayed to the user, then display generator client 112 may set the new page size associated with messages 812 for the particular user to be 75 messages. Furthermore, display generator client 112 may set the new page size for messages 812 for the particular user to be the average of the total messages caused to be displayed as a result of the user activating see more button 814.

After setting a new page size for messages 812 for a user, the next time the user requests that display generator client 112 display GUI 810, display generator client 112 displays a number of messages 812 based on the new page size for the message list recorded for the user, e.g., display generator client 112 displays 75 of the most recently modified messages of messages 812.

A user may be associated with a page size number for each of more than one message list. For example, a particular user has accessed both a first message list, messages 812 of FIG. 8, that lists discussion threads for a first topic and a second message list that lists discussion threads for a second topic. Display generator 122 sets a default page size for the particular user for messages 812 as 25 messages and a default page size for the particular user for the second message list as 10 messages.

Display generator client 112 receives a request from the particular user to display the second message list. Display generator client 112 prepares a GUI with 10 messages from the second message list, based on the default page size for the second message list for the particular user. While the GUI displays the second message list, the particular user triggers a mechanism for viewing more messages from the second message list. Display generator client 112 then displays more of the messages from the second message list to the particular user, e.g., 20 total messages.

Display generator client 112 maintains a history of usage of the mechanism for displaying more messages from the second message list. When the history of usage satisfies certain pre-defined criteria, which may or may not be the same as the pre-defined criteria associated with see more button 814, display generator client 112 increases the default page size for the particular user for the second message list. When the particular user requests that display generator client 112 display the second message list after display generator client 112 increased the default page size for the particular user for the second message list, display generator client 112 displays a GUI with a number of messages from the second list of messages that is based on the new default page size.

In one embodiment, when a particular user triggers a mechanism for displaying more messages from a first message list, display generator 122 adjusts the default page size for a second message list for the particular user. For example, display generator 122 determines that first and second message lists have a common property, e.g., the lists have a common administrator user, the lists pertain to the same topic, etc. Thus, when historical usage of a mechanism for increasing the number of displayed messages for the first message list satisfies pre-defined criteria, display generator client 112 and/or display generator 122 increases a default page size for the second message list for the particular user. The pre-defined criteria of this embodiment may or may not be the same as pre-defined criteria for increasing the default page size for the first message list for the particular user.

In another embodiment, if historical usage of a mechanism for viewing more messages from a certain list of messages satisfies certain pre-defined criteria, a default page size for multiple users for the certain list of messages is adjusted to at least a threshold value. For example, such pre-defined criteria may be a certain percentage of the total users of the certain list of messages have satisfied criteria to increase the page size for the certain list of messages, which results in a page size increase associated with the certain list of messages for all users of the certain list of messages.

Data Update Triggers

In addition to updating information cache 118 when a user requests display of a message list, display generator client 112 may also update information cache 118 upon other events. For example, GUI 820 of FIG. 8 illustrates a focal message 824 and messages 822 that are child messages of message 824, as described above. Display generator client 112 may update data in information cache 118 for message 824 and messages 822, including metadata, context data, and new reply messages, when a user activates toolbar 801, e.g., by clicking or tapping on an area of toolbar 801 that is not a shortcut. Further, display generator client 112 may update data in information cache 118 for message 824 and messages 822 when message 824 is established as the focal message.

Display generator client 112 may also update information cache 118 upon receiving a request to display a notification with a message shortcut to the user. Many times, such a notification occurs when new data has been added to one of the message hierarchies that are stored at information cache 118. Thus, when a notification is received, display generator client 112 may retrieve updated information for a message hierarchy associated with the message referred to by the message shortcut in the notification. As stated previously, updates for information cache 118 retrieved from display generator 122 is limited to information that has changed since the last time that requested information was updated. Thus, when a user receives many notifications about new messages in an active message hierarchy, display generator client 112 only retrieves information that is not already in information cache 118 upon receiving the notifications. Information cache 118 allows display generator client 112 to retrieve context information for a message referred to in a message shortcut quickly, without retrieving information already stored at information cache 118 from display generator 122 via network 130.

Server policies managed by display generator 122 or client policies managed by display generator client 112 may control when information cache 118 is updated. Such policies may restrict a rate of updating information cache 118, e.g., during certain days and times. For example, a server policy may be set by an administrator user that requires that an information cache such as information cache 118 be updated at no more than a certain rate from 4:00 PM to 8:00 PM on weekdays. An update rate indicates a certain number of updates in a certain amount of time (e.g., once every minute). As another example, a server or client policy may require that if a particular display generator client such as display generator client 112 is connected to display generator 122 via a particular kind of network connection, e.g., 3G or non-WiFi, etc., then the information cache 118 associated with the client is updated at no more than a certain rate. As yet another example, a server policy may state that if the time for display generator 122 to respond to a client request is above a certain threshold, e.g., 30 seconds, then the rate of updating any information cache associated with any client may not exceed a certain rate. Client policies may be set by individual users, e.g., by allowing a user to adjust information management preferences at display generator client 112. In an embodiment, server policies are applicable to multiple users, such as to a group of users or to all users, and client policies are applicable to the user that set the client policies.

Keeping information cache 118 current with information at server device 120 allows a user to jump to a message, e.g., referred to in a message shortcut, without incurring the relatively significant cost of downloading all of the context information and related messages to populate a GUI. Also, information cache 118 allows the above-described GUIs to be used when client device 110 has lost connection with network 130. Furthermore, display generator client 112 can run searches on information cache 118 without requesting invocation of any search functionality at server device 120.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
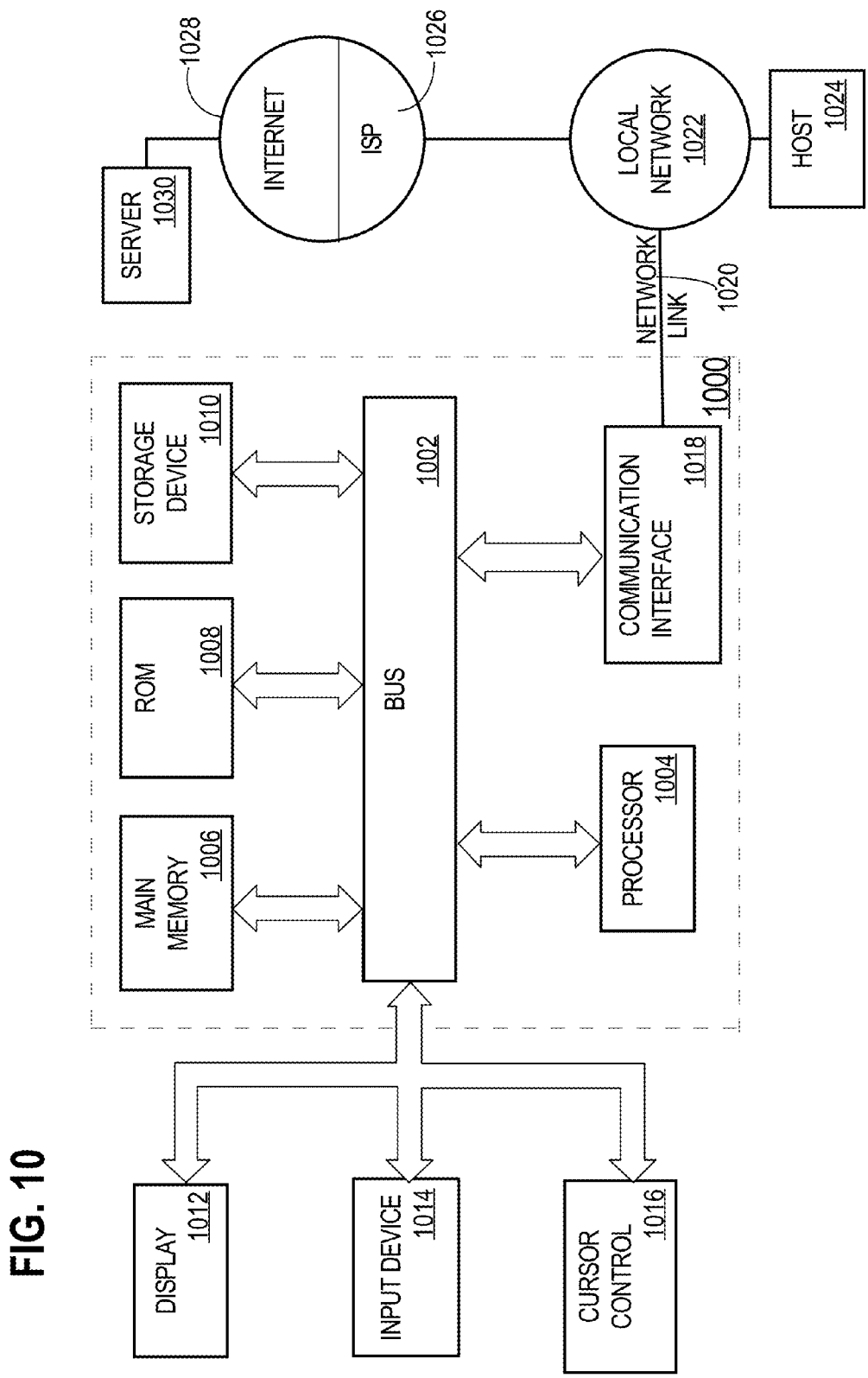
FIG. 10 is a block diagram of a computer system on which embodiments may be implemented.

For example, FIG. 10 is a block diagram that illustrates a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    displaying, within a graphical user interface on a computing device, a first number of messages, which have been downloaded to a cache, from a first set of messages;
    wherein the first set of messages includes messages that have not been downloaded to the cache;
    providing a mechanism by which a user may download, to the cache, additional messages from the first set of messages;
    maintaining a history that tracks how frequently the mechanism has been used to download additional messages to the cache; and
    based on how frequently the mechanism has been used to download additional messages to the cache, as indicated by the history, automatically increasing how many messages are stored in the cache for the first set of messages in response to a subsequent request to display messages from the first set of messages.

2. The method of claim 1, further comprising:
prior to the step of displaying, associating, with a particular user, the first number of messages as a first default number for the first set of messages;
receiving, from the particular user, a first request to display messages from the first set of messages;
wherein the first request is distinct from the subsequent request;
performing the step of displaying in response to receiving the first request;
wherein the step of displaying further comprises:
identifying that the first default number associated with the particular user for the first set of messages is the first number of messages; and
displaying no more messages than the first number of messages in response to the first request.

3. The method of claim 2, further comprising:
wherein increasing how many messages are stored in the cache for the first set of messages in response to a subsequent request to display messages from the first set of messages further comprises changing the first default number, for the first set of messages, associated with the particular user, to a second number;
wherein the second number is greater than the first number;
after receiving the first request, receiving, from the particular user, the subsequent request to display messages from the first set of messages; and
in response to receiving the subsequent request to display messages from the first set of messages, displaying the second number of the first set of messages within the graphical user interface.

4. The method of claim 2, further comprising:
associating, with the particular user, a second number as a second default number for a second set of messages;
after associating, with the particular user, the second number as the second default number for the second set of messages, receiving, from the particular user, a request to display messages from the second set of messages;
in response to receiving the request to display messages from the second set of messages:
displaying to the particular user, within the graphical user interface, no more messages than the second number of messages from the second set of messages based, at least in part, on the second default number associated with the particular user;
wherein the first set of messages are messages from a first forum;
wherein the history is a first history that tracks how frequently the mechanism has been used to download additional messages from the first forum to the cache;
wherein the second set of messages are messages from a second forum;
providing a second mechanism by which the particular user may download, to the cache, additional messages from the second forum;
maintaining a second history, separate from the first history, that tracks how frequently the second mechanism has been used to download additional messages from the second forum to the cache; and
in response to detecting that historical usage of the second mechanism satisfies certain pre-defined criteria, increasing the second default number.

5. The method of claim 4, wherein the certain pre-defined criteria comprises exceeding a pre-defined number of activations of the second mechanism for the second set of messages.

6. The method of claim 1, further comprising based on how frequently the mechanism has been used to download additional messages from the first set of messages to the cache, as indicated by the history, increasing a second number of messages that are displayed within a second graphical user interface when a request to display messages from a second set of messages is received.

7. The method of claim 1, wherein:
messages of the first set of messages are associated with respective timestamps;
messages from the first set of messages are displayed in an ordered list based on reverse chronological order of the associated timestamps.

8. The method of claim 7, wherein a timestamp for a particular message represents a time that the particular message was last modified.

9. A non-transitory computer-readable medium that stores sequences of instructions which, when executed by one or more processors, cause:
displaying, within a graphical user interface on a computing device, a first number of messages, which have been downloaded to a cache, from a first set of messages;
wherein the first set of messages includes messages that have not been downloaded to the cache;
providing a mechanism by which a user may download, to the cache, additional messages from the first set of messages;
maintaining a history that tracks how frequently the mechanism has been used to download additional messages to the cache; and
based on how frequently the mechanism has been used to download additional messages to the cache, as indicated by the history, automatically increasing how many messages are stored in the cache for the first set of messages in response to a subsequent request to display messages from the first set of messages.

10. The non-transitory computer-readable medium of claim 9, further comprising sequences of instructions which, when executed, cause:
prior to the step of displaying, associating, with a particular user, the first number of messages as a first default number for the first set of messages;
receiving, from the particular user, a first request to display messages from the first set of messages;
wherein the first request is distinct from the subsequent request;
performing the step of displaying in response to receiving the first request;
wherein the step of displaying further comprises:
identifying that the first default number associated with the particular user for the first set of messages is the first number of messages; and
displaying no more messages the first number of messages in response to the first request.

11. The non-transitory computer-readable medium of claim 10, further comprising sequences of instructions which, when executed, cause:
wherein increasing how many messages are stored in the cache for the first set of messages in response to a subsequent request to display messages from the first set of messages further comprises changing the first default number, for the first set of messages, associated with the particular user, to a second number;
wherein the second number is greater than the first number;

after receiving the first request, receiving, from the particular user, the subsequent request to display messages from the first set of messages; and in response to receiving the subsequent request to display messages from the first set of messages, displaying the second number of the first set of messages within the graphical user interface.

12. The non-transitory computer-readable medium of claim 10, further comprising sequences of instructions which, when executed, cause:

associating, with the particular user, a second number as a second default number for a second set of messages;

after associating, with the particular user, the second number as the second default number for the second set of messages, receiving, from the particular user, a request to display messages from the second set of messages;

in response to receiving the request to display messages from the second set of messages:

displaying to the particular user, within the graphical user interface, no more messages than the second number of messages from the second set of messages based, at least in part, on the second default number associated with the particular user;

wherein the first set of messages are messages from a first forum;

wherein the history is a first history that tracks how frequently the mechanism has been used to download additional messages from the first forum to the cache;

wherein the second set of messages are messages from a second forum;

providing a second mechanism by which the particular user may download, to the cache, additional messages from the second forum;

maintaining a second history, separate from the first history, that tracks how frequently the second mechanism has been used to download additional messages from the second forum to the cache; and in response to detecting that historical usage of the second mechanism satisfies certain pre-defined criteria, increasing the second default number.

13. The non-transitory computer-readable medium of claim 12, wherein the certain pre-defined criteria comprises exceeding a pre-defined number of activations of the second mechanism for the second set of messages.

14. The non-transitory computer-readable medium of claim 9, further comprising sequences of instructions which, when executed, cause based on how frequently the mechanism has been used to download additional messages from the first set of messages to the cache, as indicated by the history, increasing a second number of messages that are displayed within a second graphical user interface when a request to display messages from a second set of messages is received.

15. The non-transitory computer-readable medium of claim 9, wherein:

messages of the first set of messages are associated with respective timestamps;

messages from the first set of messages are displayed in an ordered list based on reverse chronological order of the associated timestamps.

16. The non-transitory computer-readable medium of claim 15, wherein a timestamp for a particular message represents a time that the particular message was last modified.

17. An apparatus comprising:

one or more processors;

a computer readable medium comprising instructions which, when executed by the one or more processors, cause performance of steps comprising:

displaying, within a graphical user interface on a computing device, a first number of messages, which have been downloaded to a cache, from a first set of messages;

wherein the first set of messages includes messages that have not been downloaded to the cache;

providing a mechanism by which a user may download, to the cache, additional messages from the first set of messages;

maintaining a history that tracks how frequently the mechanism has been used to download additional messages to the cache; and based on how frequently the mechanism has been used to download additional messages to the cache, as indicated by the history, automatically increasing how many messages are stored in the cache for the first set of messages in response to a subsequent request to display messages from the first set of messages.

* * * * *